United States Patent
Fan et al.

(10) Patent No.: US 10,997,929 B2
(45) Date of Patent: May 4, 2021

(54) DISPLAY SCENE PROCESSING METHOD AND DEVICE AND STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qingwen Fan, Beijing (CN); Yukun Sun, Beijing (CN); Jinghua Miao, Beijing (CN); Wenyu Li, Beijing (CN); Xuefeng Wang, Beijing (CN); Bin Zhao, Beijing (CN); Jianwen Suo, Beijing (CN); Jinbao Peng, Beijing (CN); Xi Li, Beijing (CN); Zhifu Li, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/553,981

(22) Filed: Aug. 28, 2019

(65) Prior Publication Data
US 2020/0279533 A1    Sep. 3, 2020

(30) Foreign Application Priority Data
Mar. 1, 2019   (CN) .......................... 201910156033.8

(51) Int. Cl.
*G09G 3/34* (2006.01)
*G09G 5/12* (2006.01)
*G02B 27/00* (2006.01)

(52) U.S. Cl.
CPC ......... *G09G 3/342* (2013.01); *G02B 27/0025* (2013.01); *G09G 5/12* (2013.01); *G09G 2310/024* (2013.01); *G09G 2310/08* (2013.01)

(58) Field of Classification Search
None
See application file for complete search history.

(56) References Cited

U.S. PATENT DOCUMENTS

| 2005/0041031 A1* | 2/2005 | Diard | G09G 5/393 |
| | | | 345/505 |
| 2015/0206326 A1* | 7/2015 | Zhao | G06T 1/0007 |
| | | | 382/131 |
| 2018/0039317 A1* | 2/2018 | Riguer | G09G 5/363 |

* cited by examiner

*Primary Examiner* — Christopher J Kohlman
(74) *Attorney, Agent, or Firm* — Dilworth & Barrese, LLP.; Michael J. Musella, Esq.

(57) ABSTRACT

A display scene processing method and a display scene processing device and a storage medium thereof are disclosed. The display scene processing method includes the following steps: obtaining a vertical synchronization signal; executing a rendering thread to render a first half-screen scene data and a second half-screen scene data based on the vertical synchronization signal; executing an asynchronous time warping thread to correct the rendered first half-screen scene data and the rendered second half-screen scene data to obtain first half-screen scene correction data and second half-screen scene correction data.

18 Claims, 13 Drawing Sheets

---

S310: predicting a first user pose data after a first predetermined amount of display refresh frames

↓

S320: conducting rendering based on the first user pose data to obtain the rendered first half-screen scene data and the rendered second half-screen scene data S331: predicting a user pose data of the quarter frame after the start time point of the display frame to obtain a second asynchronous time warping correction reference data for the first half-screen.

S341: correcting the rendered first half-screen scene data based on the second asynchronous time warp correction reference data to obtain first half-screen scene correction data.

S351: predicting a user pose data of three-quarters of the frames after the start time point of the display frame to obtain a third asynchronous time warping correction reference data for the second half-screen.

S361: correcting the rendered second half-screen scene data based on the third asynchronous time warping correction reference data to obtain second half-screen scene correction data.

FIG. 3C

S810A: predicting a user pose data of the quarter frame after the start time point of the display frame to obtain a fifth asynchronous time warping correction reference data for the first half-screen.

S820A: correcting the rendered first half-screen scene data by asynchronous time warping based on the fifth asynchronous time warping correction reference data to obtain first half-screen scene correction data.

FIG. 8A

S810B: predicting a user pose data of three-quarters of frames after the start time point of the display frame to obtain a seventh asynchronous time warp correction reference data for the second half-screen.

S820B: correcting the rendered second half-screen scene data based on the seventh asynchronous time warping correction reference data to obtain a second half-screen scene correction data.

FIG. 8B

DISPLAY SCENE PROCESSING METHOD AND DEVICE AND STORAGE MEDIUM

CROSS-REFERENCE TO RELATED APPLICATION

The present application claims priority of the Chinese Patent Application No. No. 201910156033.8, filed on Mar. 1, 2019, entitled "Method, Device, and Storage Medium for Processing Display Scene", the disclosure of which is incorporated herein by reference in its entirety as part of the present application.

TECHNICAL FIELD

Embodiments of the present disclosure relate to a display scene processing method, a display scene processing device, and a storage medium, which can be used in virtual reality.

BACKGROUND

Virtual reality (VR) system is a computer simulation system that can create and be used for experiencing a virtual world. VR system merges information from multiple sources to provide users with an interactive three-dimensional dynamic view. VR system can also allow the user to be immersed into the simulated environment by simulating a user's behavior. Virtual reality technology includes various aspects, such as an environmental simulation technology, a user behavior perception technology and the like. The environmental simulation technology is a technology which generates vivid dynamic three-dimensional images in real time by using computers. The user behavior perception technology is a technology that may be used in an ideal virtual reality system to find all the perceptions of a user. In addition to a visual perception generated by computer graphics technology, there are many other types of perceptions, such as sense of hearing, sense of touch, movement, and even senses of smell and taste, which are also known as multi-perception.

The widespread application of virtual reality technology requires that a virtual reality device or system to be able to maintain a high frame rate to provide three-dimensional images in a manner of more close to real time.

SUMMARY

According to a first aspect of the present disclosure, a display scene processing method is provided. The method includes: obtaining a vertical synchronization signal; executing a rendering thread to render a first half-screen scene data and a second half-screen scene data based on the vertical synchronization signal; executing an asynchronous time warping thread to correct the rendered first half-screen scene data and second half-screen scene data to obtain first half-screen scene correction data and second half-screen scene correction data.

For example, in at least one embodiment, the rendering of the first half-screen scene data and the second half-screen scene data is performed with a multiple render targets technique.

For example, in at least one embodiment, executing a rendering thread for rendering a first half-screen scene data and a second half-screen scene data based on the vertical synchronization signal comprises: predicting first user posture data after a first predetermined amount of display refresh frame from a current time point, and rendering the first half-screen scene data and the second half-screen scene data based on the first user posture data to obtain the rendered first half screen scene data and the rendered second half screen scene data.

For example, in at least one embodiment, executing an asynchronous time warping thread comprises: after obtaining the rendered first half-screen scene data and second half-screen scene data, predicting second user posture data at a start time point of a display frame and a third user posture data at an end time point of the display frame, wherein the display frame is a frame during which the first half-screen scene data and the second half-screen scene data are displayed; and correcting the rendered first half-screen scene data and the rendered second half-screen scene data based on the second user posture data and the third user posture data to obtain the first half-screen scene correction data and the second half-screen scene correction data.

For example, in at least one embodiment, correcting the rendered first half-screen scene data and the rendered second half-screen scene data based on the second user posture data and the third user posture data comprises: performing an interpolation calculation based on the second user posture data and the third user posture data to obtain a first asynchronous time warping correction reference data, and correcting the rendered first half-screen scene data and the rendered second half-screen scene correction data based on the first asynchronous time warping correction reference data.

For example, in at least one embodiment, executing an asynchronous time warping thread comprises: predicting data of a user posture at a quarter of a display frame after a start time point of the display frame, so as to obtain a second asynchronous time warping correction reference data for the first half-screen scene, wherein the display frame is a frame during which the first half-screen scene data and the second half-screen scene data are displayed; correcting the rendered first half-screen scene data based on the second asynchronous time warp correction reference data to obtain a first half-screen scene correction data; predicting user posture data at three-quarters of the display frame after the start time point of the display frame, so as to obtain third asynchronous time warp correction reference data for the second half-screen scene; and correcting the rendered second half-screen scene data based on the third asynchronous time warp correction reference data to obtain the second half-screen scene correction data.

For example, in at least one embodiment, the method further comprises: performing anti-distortion processing on the first half-screen scene correction data and the second half-screen scene correction data to obtain a first half-screen scene output data and a second half-screen scene output data.

For example, in at least one embodiment, executing the rendering thread comprises: executing a first half-screen rendering thread and a second half-screen rendering thread in parallel to render the first half-screen scene data and the second half-screen scene data respectively, wherein the first half-screen rendering thread is executed on the first half-screen scene data and the second half-screen rendering thread is executed on the second half-screen scene data.

For example, in at least one embodiment, executing an asynchronous time warping thread comprises: executing a first asynchronous time warping thread and a second asynchronous time warping thread in parallel to obtain the first half-screen scene correction data and the second half-screen scene correction data, wherein the first asynchronous time warping thread is executed on the rendered first half-screen scene data and the rendered second asynchronous time warping thread is executed on the second rendered half-screen scene data.

For example, in at least one embodiment, executing the first half screen rendering further comprises: predicting fourth user posture data after time of (M+0.5) display refresh frame from the vertical synchronization signal, wherein M is greater than or equal to one (1), and rendering the first half-screen scene data based on the fourth user posture data to obtain the rendered first half-screen scene data.

For example, in at least one embodiment, executing of the first asynchronous time warping thread further comprises: after obtaining the rendered first half-screen scene data, predicting fifth user posture data at a start time point of a display frame and sixth user posture data at an end time point of the display frame, wherein the display frame is a frame during which the first half-screen scene data and the second half-screen scene data are displayed; and correcting the rendered first half-screen scene data based on the fifth user posture data and the sixth user posture data to obtain the first half-screen scene correction data.

For example, in at least one embodiment, the display scene processing method further comprises: correcting the rendered first half-screen scene data based on the fifth user posture data and the sixth user posture data includes: performing an interpolation calculation based on the fifth user posture data and the sixth user posture data to obtain a fourth asynchronous time warping correction reference data for the first half screen scene, and then correcting the rendered first half-screen scene data based on the fourth asynchronous time warping correction reference data.

For example, in at least one embodiment, correcting of the rendered first half screen scene data based on the fifth user posture data and the sixth user posture data further comprises: performing an interpolation calculation based on the fifth user posture data and the sixth user posture data to obtain a fourth asynchronous time warping correction reference data for the first half screen scene, and then correcting the rendered first half-screen scene data based on the fourth asynchronous time warping correction reference data.

For example, in at least one embodiment, executing the second half screen rendering thread further comprises: predicting seventh user posture data after time of K+0.5 display refresh frames from the current time point, wherein K is greater than or equal to one (1), and rendering the second half-screen scene data based on the seventh user posture data to obtain the rendered second half-screen scene data.

For example, in at least one embodiment, executing of the second half-screen asynchronous time warping thread further comprises: after obtaining the rendered second half-screen scene data, predicting eighth user posture data at a half of frame after a start time point of the display frame and a ninth user posture data at an end time point of the display frame, wherein the display frame is a frame during which the first half-screen scene data and the second half-screen scene data are displayed; and correcting the rendered second half-screen scene data based on the eighth user posture data and the ninth user posture data to obtain the second half-screen scene correction data.

For example, in at least one embodiment, executing of the second asynchronous time warping thread further comprises: predicting data of a user posture at three quarters of frame after a start time point of the display frame to obtain a seventh asynchronous time warping correction reference data for the second half-screen scene, wherein the display frame is a frame during which the first half-screen scene data and the second half-screen scene data are displayed; and correcting the rendered second half-screen scene data based on the seventh asynchronous time warp correction reference data to obtain the second half-screen scene correction data.

For example, in at least one embodiment, the display scene processing method further comprises: transferring, by the first asynchronous time warping thread, the first half-screen scene correction data to the second asynchronous time warping thread.

For example, in at least one embodiment, the anti-distortion processing is at least one of vertex displacement-based anti-distortion processing, mesh-based anti-distortion processing and pad-based anti-distortion processing.

For example, in at least one embodiment, the method further comprises: outputting the first half-screen scene output data and the second half-screen scene output data to a first half-screen display screen and a second half-screen display screen respectively, so as to display the first half-screen scene output data and the second half-screen scene output data in a display frame, wherein the display frame is a frame during which the first half-screen scene data and the second half-screen scene data are displayed.

According to a second aspect of the present disclosure, a display scene processing device is provided, which comprises a processor and a memory, wherein computer-executable instructions that are suitable to be executed by the processor are stored in the memory, upon being executed by the processor, the method described above is carried out by the processor.

According to a third aspect of the present disclosure, a nonvolatile storage medium storing computer-executable instructions is provided, wherein the computer-executable instructions, upon being executed by a processor, cause a computer to carry out the above-described method.

BRIEF DESCRIPTION OF THE DRAWINGS

In order to more clearly explain the technical scheme of embodiments of the present disclosure, the drawings needed in the description of the embodiment is described as following. The drawings described as following are merely exemplary embodiments of the present disclosure.

FIG. 3C is a flowchart illustrating an asynchronous time warping thread of a display scene processing method according to at least one embodiment of the present disclosure;

FIG. 8A is a flowchart illustrating the correction of rendered first half-screen scene data by asynchronous time warping in a display scene processing method according to at least one embodiment of the present disclosure;

FIG. 8B is a flowchart illustrating the correction of rendered second half-screen scene data by asynchronous time warping in a display scene processing method according to at least one embodiment of the present disclosure;

DETAILED DESCRIPTION

Figure 1A:
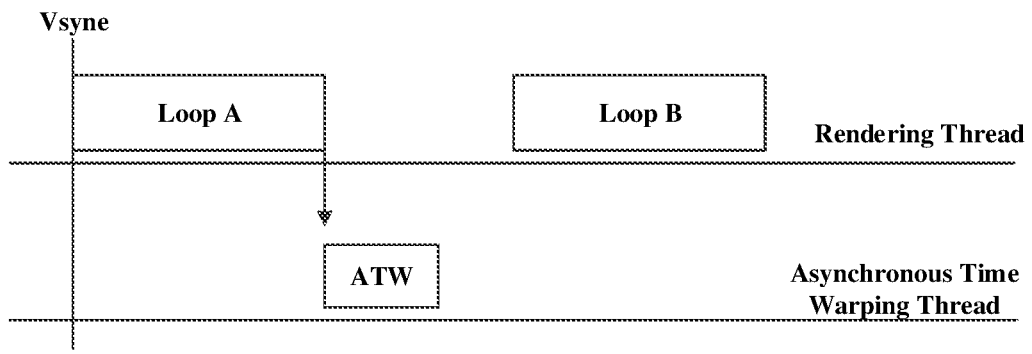
FIG. 1A is a diagram illustrating a display scene processing method according to at least one embodiment of present disclosure.

In order to make the objects, technical solutions and advantages of present disclosure more obvious, exemplary embodiments according to the present disclosure will be described in detail below with reference to the accompanying drawings. Obviously, the described embodiments merely are parts of the embodiments of the present disclosure, other than all the embodiments of the present disclosure, and it should be understood that the present disclosure is not limited to the example embodiments described herein. Based on the embodiments described in the present disclosure, all other embodiments obtained by those skilled in the art without creative labor should fall within the scope of the present disclosure.

It should be noticed that in present specification and drawings, like steps and elements are denoted by like reference marks, and descriptions of repeated steps and elements will be omitted.

According to exemplary embodiments, for example, a virtual reality system may include a head-mounted device, such as a virtual reality helmet, virtual reality glasses and the like to generate an immersive virtual world environment according to information of user's actions, perceptions, etc. However, in a condition that a user uses a virtual reality head-mounted device, delay of scene rendering might occur if the user moves too fast. For example, when the user turns his head in a sudden, although the user's head has turned to a new position, the image corresponding to the new position has not been rendered yet, or the rendered image is still the image of the previous frame, thus the image seen by the user does not coincide with the image of the expected new position, resulting in delay in displaying the image and giving the user a sense of vertigo.

In order to reduce the delay of rendering images in the display scene, some virtual reality devices adopt Timewarp (TW) technology. TW technology is a technology that corrects image frames, which solves the problem of delay in rendered scene by warping (or correcting) the rendered scene data based on changes in user actions after rendering. Because the time when the time warping process is performed is closer to the display time, the new display image obtained through the time warping process is closer to the image that the user expects to see. Meanwhile, because the time warping technology could be applied on two-dimensional images, which is similar to affine transformation in image processing, adopting the time warping technology would not bring excessive system workload overhead. Usually, the time warping processing and rendering processing are performed in a same thread, which leads to a long processing time of the thread and affects the solving of delay problem in image processing.

In this regard, embodiments of the present application suggest an improved display scene processing method, which uses asynchronous timewarp (ATW) technology to further optimize the TW technology and reduce image delay. Specifically, asynchronous time warping technology, which arranges rendering and time warping in two different threads respectively, can further optimize the above-mentioned time warping technology. Thus the rendering step and the time warping step can be executed asynchronously, thereby reducing the overall running time of the rendering processing and the time warping processing. For example, when the virtual reality application cannot maintain a sufficient frame rate, the asynchronous time warping thread will process the previously rendered scene data according to the current user posture to generate a frame picture (intermediate frame) conforming to the current user posture, thereby reducing the jitter of the picture, and further reducing the delay.

Figure 1B:
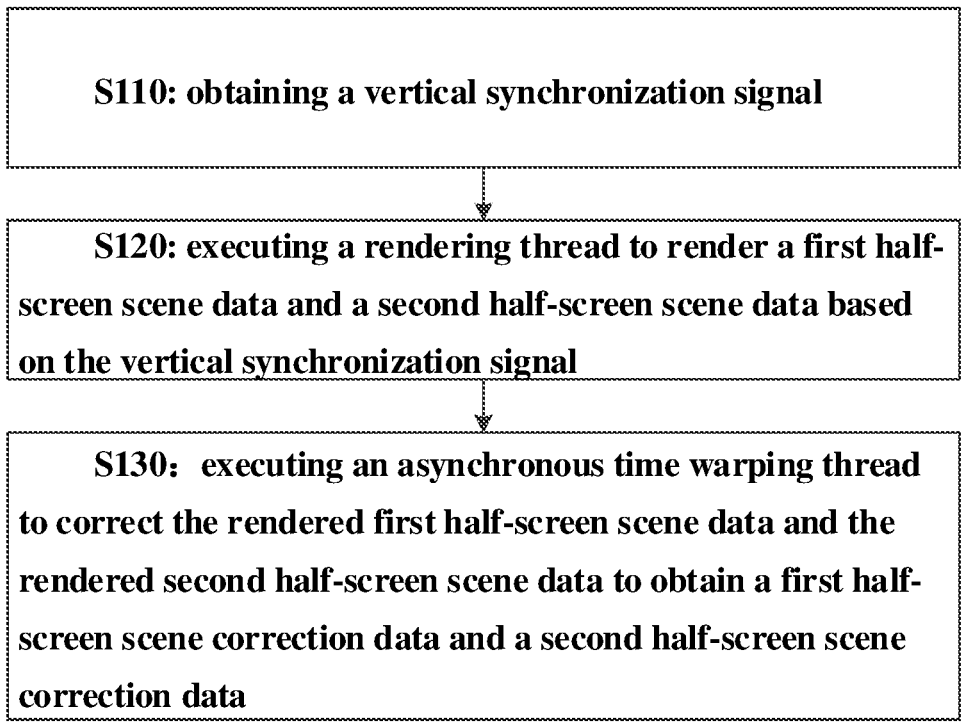
FIG. 1B is a flowchart illustrating a display scene processing method according to at least one embodiment of present disclosure.

FIG. 1A is a diagram illustrating a display scene processing method according to at least one embodiment of present disclosure, and FIG. 1B is a flowchart illustrating a display scene processing method as shown in FIG. 1A. This method can be used to realize scene rendering of virtual reality.

Referring to FIG. 1A, the display scene processing method may include two threads, a rendering thread and an asynchronous time warping thread, running in parallel. For example, the display scene processing method can be used for a virtual reality display device or an augmented reality display device including a left-eye display screen and a right-eye display screen, for example, such as a virtual display helmet, an augmented reality display helmet, etc. The virtual reality display device may further include a motion sensor (such as a gyroscope, an acceleration sensor and the like), a central processing unit (CPU), a memory, an image processing unit (GPU), a communication device, etc. The method can be executed, for example, by a central processing unit or an image processing unit for the virtual reality display device cooperating with corresponding computer program codes. The virtual reality display device can adopt various appropriate operating systems, such as an Android system, a Linux system, a Unix system or a Windows system, etc. An Android system is taken as an example in the following description, but the embodiments of the present disclosure are not limited thereto.

The rendering thread renders a first half-screen scene data and a second half-screen scene data according to a vertical synchronization signal so as to obtain the scene that the user expects to see. Specifically, the vertical synchronization (Vsync) is a synchronization signal applied between two display frames, which indicates the end of the previous frame and the start of the next frame. The signal is valid once before each frame of scanning. The signal can determine a field frequency of the display device, i.e. the times of screen refreshes per second, which can also be referred as refresh frequency of the display device. For example, the refresh frequency of the display device may be 60 Hz, 120 Hz, etc., that is 60 times per second, 120 times per second, etc., and one display frame time is 1/60 second, 1/120 second, etc. The vertical synchronization signal is generated by, for example, a display driving device (e.g., a graphics card), and is gate driving signals, data signals and other signals required for synchronously displaying a frame of pictures during the display process.

As shown in FIG. 1A, the rendering thread will finish rendering the first half-screen scene data and the second half-screen scene data in loop A, and send the rendered first half-screen scene data and second half-screen scene data to the asynchronous time warping thread (e.g., ATW in FIG. 1A) after completing rendering.

The asynchronous time warping thread can correct the rendered first half-screen scene data and the second half-screen scene data to obtain the first half-screen scene output data and the second half-screen scene output data. More specifically, the asynchronous time warping thread may generate one or more intermediate frames according to the rendered first half-screen scene data and second half-screen scene data.

Under the condition that the rendering thread cannot finish rendering and outputting of data in the duration of one display frame, the asynchronous time warping thread will output the intermediate frame formed by asynchronous time warping to the display to reduce the vertigo of the user.

Referring to FIG. 1B, the steps in the rendering thread in FIG. 1A and the corresponding asynchronous time warping thread thereafter are schematically illustrated. In this method, the rendering thread includes at least the following two steps S110 and S120. In step S110, a vertical synchronization signal is obtained. In step S120, a rendering thread is performed to render a first half-screen scene data and a second half-screen scene data based on the vertical synchronization signal.

In this method, firstly, a vertical synchronization signal is obtained, and then a rendering thread (e.g., Loop A in FIG. 1A) renders both a first half-screen scene data and a second half-screen scene data based on the vertical synchronization signal. After the rendering of the first half-screen scene data and the second half-screen scene data is completed in Loop A, in Loop B, the rendering thread can perform the next rendering of the new first half-screen scene data and the second half-screen scene data according to a new user posture according to the next vertical synchronization signal. The first half-screen scene data and the second half-screen scene data are, for example, pre-stored image data read from a storage device, for example, the pre-stored image data for a virtual reality display device includes image data of corresponding applications, for example, image data about visiting museums, racetracks of racing games, etc.

Alternatively, the first half-screen may be a screen that displays an image seen by the user's left eye, and the second half-screen may be a screen that displays an image seen by the user's right eye. The first half-screen scene data may include various parameters of an object that should be presented in the field of view of the user's left eye, while the second half-screen scene data may include various parameters of an object that should be presented in the field of view of the user's right eye. As described above, meanings of the first half-screen and the second half-screen can be exchanged, and the first half-screen and the second half-screen can be various types of display screens, such as a liquid crystal display (LCD), an organic light emitting diode display (OLED), a Micro-LED display screen, and the like. These display devices, for example, refresh one frame of display image by scanning row by row.

In order to present, by the virtual reality device, all the objects that can be observed by a user in his visual field when he is using the virtual reality device, usually, it is necessary to render all the objects within the visual field of the user. At the same time, different images need to be presented to the user's left and right eyes (i.e. for forming parallax). Then, different images of the left and right eyes could be synthesized in the user's mind. Thus, a visually stereoscopic images is presented to the user. Therefore, in the first half-screen scene data and the second half-screen scene data, the parameters, even for the same object, may be different. For example, for the same object, the position of the object observed by the left eye and the right eye may be different, and light rays refracted to the left and right eyes through the object may also be different. Therefore, in the present disclosure, the rendering thread renders both the first half-screen scene data and the second half-screen scene data in Loop A. Compared with rendering the object as a whole and then outputting the rendered output results to the first half-screen and the second half-screen respectively through affine transformation, more accurate and more stereoscopic images could be obtained in this way.

Optionally, the rendering of the first half-screen scene data and the second half-screen scene data is performed with, for example, multiple render targets (MRT) technology.

In the multiple render targets (MRT) technology, data for multiple pixels can be saved in different buffers (e.g., buffers for color mapping, buffers for normal mapping, and buffers for depth mapping), so that the data can be used as parameters of subsequent lighting effects shaders, which results in the improved fineness of the output image. By adopting multiple render targets technology, the rendering of illumination information can be delayed and the rendering processing speed can be improved. Meanwhile, since the rendering thread renders the first half-screen scene data and the second half-screen scene data in Loop A respectively, data for pixels of each object in the first half-screen scene data and the second half-screen scene data needs to be stored to the above buffer area respectively, and then the above data is analyzed in the lighting effects shader. Thus the lighting effects of the images displayed in the first half-screen and the second half-screen are enhanced. Compared with the conventional illumination shading calculation for each pixel in the whole scene by using an illumination shader, in embodiments of the present disclosure, the calculation amount of the processor for illumination shading calculation could be reduced and an image of an enhanced lighting effects could be obtained when MRT is performed on the first half-screen scene data and the second half-screen scene data respectively by using a rendering thread.

In addition, the asynchronous time warping thread includes at least step S130.

In step S130, an asynchronous time warping thread is executed to correct the rendered first half-screen scene data and second half-screen scene data to obtain a first half-screen scene correction data and a second half-screen scene correction data.

Based on the statistical results of the rendering time and asynchronous time warping (ATW) processing time for one frame of display screen, the total duration of rendering the first half-screen scene data and the second half-screen scene data by the rendering thread is about the duration for displaying a half frame to one frame, while the duration for the asynchronous time warping thread to correct the rendered first half-screen scene data and the second half-screen scene data may be less than the duration for displaying a half frame. Therefore, in the display scene processing method according to the embodiment of the present disclosure, the total duration of processing the first half-screen scene data and the second half-screen scene by the rendering thread and asynchronous time warping can be about the duration of displaying a half frame to two frames. Compared with a conventional method of correcting image frames by using time warping technology to solve the delay problem of scene rendering, the embodiment of the present disclosure can reduce the total running time of the rendering thread and the asynchronous time warping thread by asynchronously executing the rendering thread and the asynchronous time warping thread.

One or more embodiments that utilize asynchronous execution of rendering threads and asynchronous time warping threads to reduce the total running time of rendering threads and asynchronous time warping threads run will be further described below.

At present, the processors of mobile terminals are mainly multi-core multi-processor architectures, such as various versions of ARM architecture processors, and of course, various versions of X86 architecture processors, etc. can be used as well. In order to fully utilize the performance of every processor, the display scene processing method according to at least one embodiment of the present disclosure can adjust the running processes of the rendering thread and ATW thread during the running process of the mobile virtual reality application.

Some embodiments of adjusting the running processes of the rendering thread and ATW thread are further described below with reference to FIG. 2A and FIG. 2B.

Figure 2A:
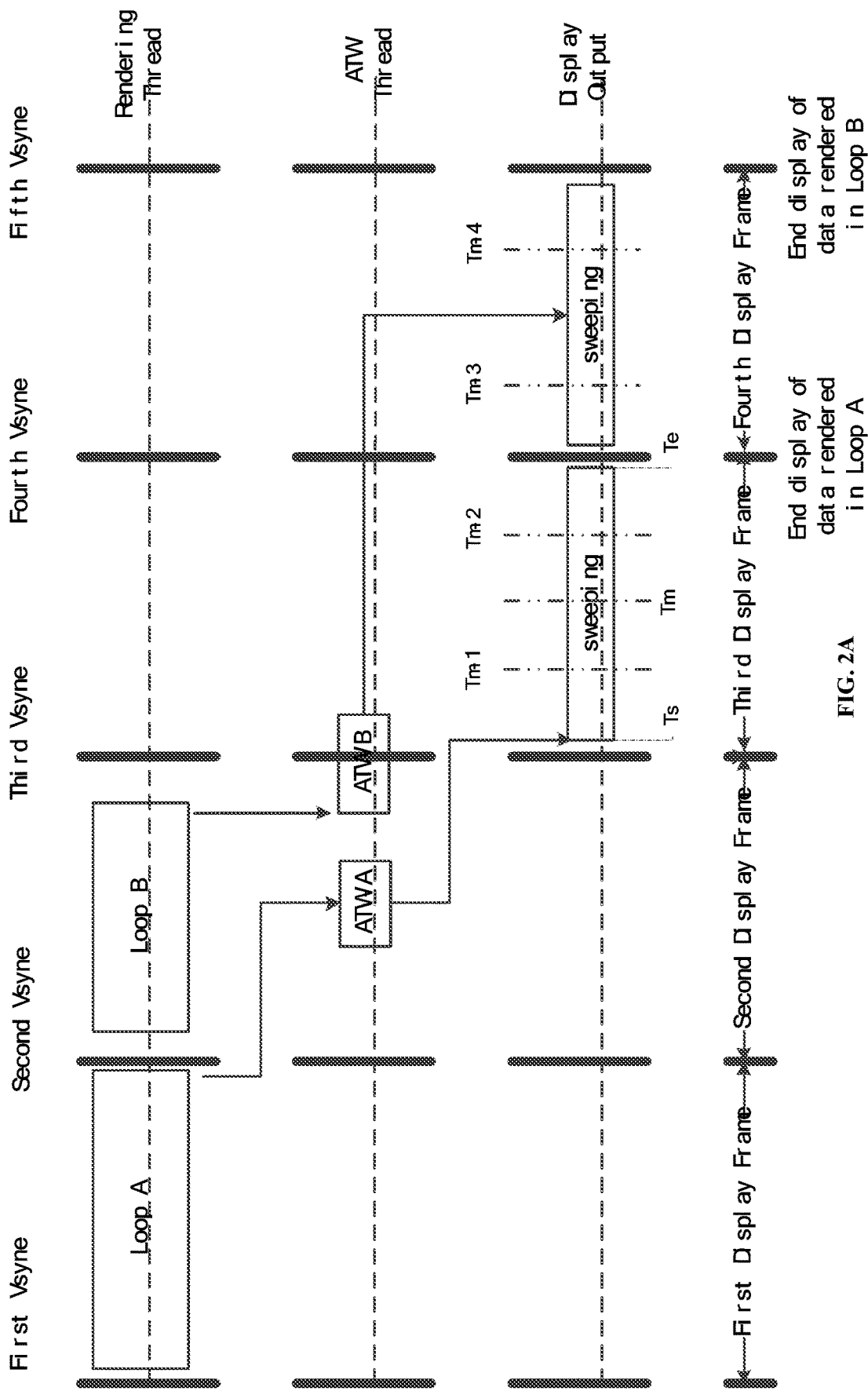
FIG. 2A is a diagram illustrating a display scene processing method according to at least one embodiment of present disclosure.
Figure 2B:
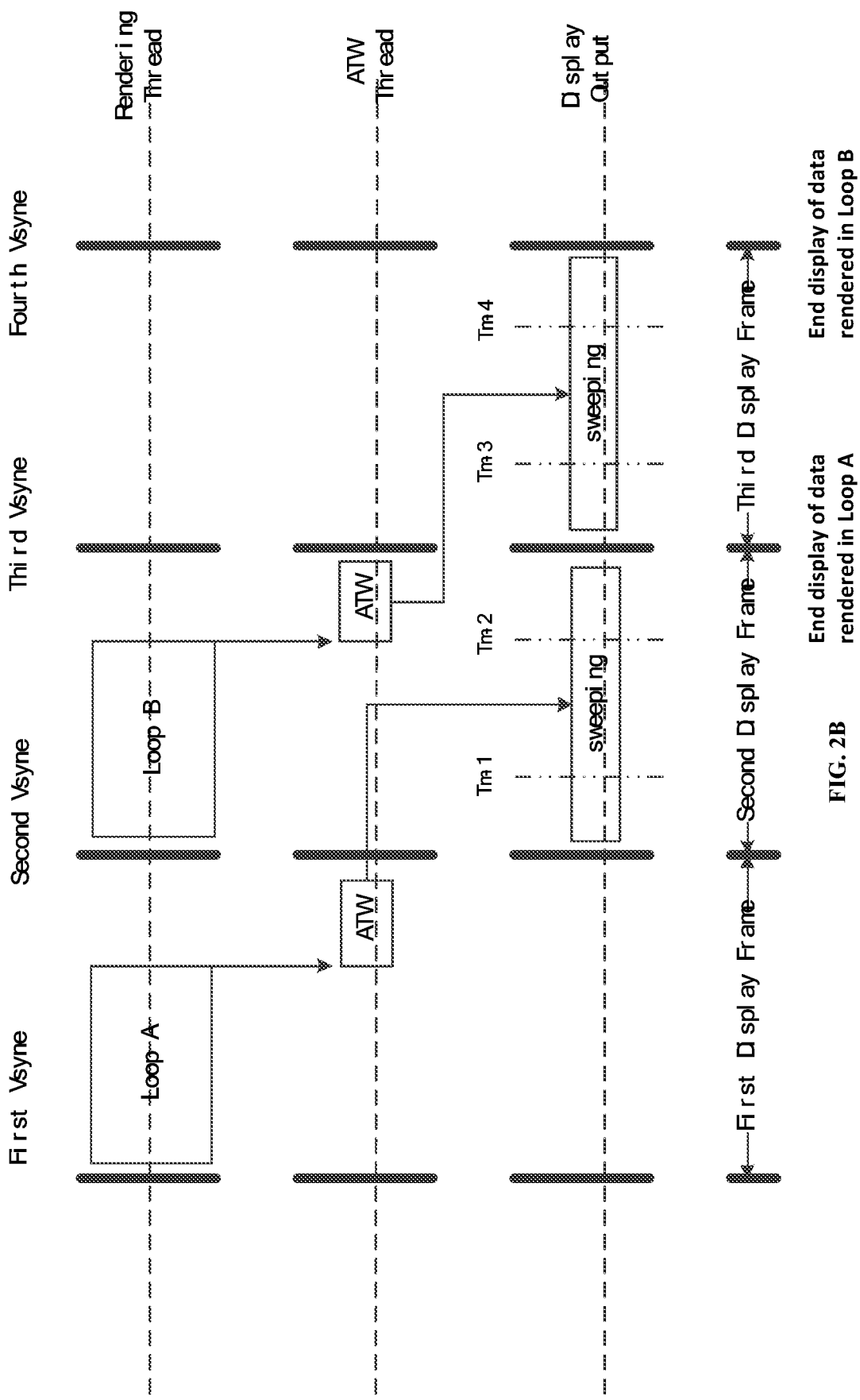
FIG. 2B is a diagram illustrating a display scene processing method according to at least one embodiment of present disclosure.

FIG. 2A and FIG. 2B are diagrams illustrating a display scene processing method according to at least one embodiment of present disclosure. The method can be used to realize scene rendering of virtual reality.

Referring to FIG. 2A, in a rendering thread, it is determined that it will enter Loop A of rendering scene data according to the first vertical synchronization signal.

In Loop A, rendering of the first half-screen scene data and the second half-screen scene data is performed by the rendering thread in series respectively.

After the rendering of the first half-screen scene data and the second half-screen scene data is completed, an asynchronous time warping thread (ATW thread) is triggered by the rendering thread, and the rendered first half-screen scene data and the rendered second half-screen scene data are sent to the asynchronous time warping thread through a thread communication with the asynchronous time warping thread. Then, in response to the next vertical synchronization signal (the second Vsync), the next Loop B for rendering scene data is performed by the rendering thread.

After receiving the rendered first half-screen scene data and the rendered second half-screen scene data, the asynchronous time warping thread corrects the rendered first half-screen scene data and the rendered second half-screen scene data to obtain a first half-screen scene output data and a second half-screen scene output data. After the correction is completed, the first half-screen scene output data and the second half-screen scene output data are output to the display screen for display in a third display frame. Herein, the duration of "display frame" refers to a duration of a frame when the display device actually performs scanning to display the aforementioned first half-screen scene data and second half-screen scene data on the display screen, that is, a "display frame" is a frame used for the first half-screen scene data and the second half-screen scene data.

Due to the difference in performances of different virtual reality display devices, the durations for processing rendering threads and asynchronous time warping threads are also different.

In the case of FIG. 2A, in some embodiments, for example, the execution duration of Loop A of the rendering thread in FIG. 2A may be close to the duration of one frame, in which case the execution of asynchronous time warping cannot be completed in the remaining time of the first display frame. At this time, the first half-screen scene data and the second half-screen scene data rendered by the rendering thread in Loop A will be displayed in two frames later (i.e., in the third display frame in FIG. 2A) and after the completion of asynchronous time processing. Thus, in the execution interval of ATW-A in FIG. 2A, the asynchronous time warping thread (ATW thread) can warp the first rendered half-screen scene data to the image that the user may see at the intermediate time Tm-1 of the first half frame duration of the third display frame and warp the rendered second half-screen scene data to the image that the user may see at the intermediate time Tm-2 of the second half frame duration of the third display frame, respectively. Thus, the first half-screen scene correction data and the second half-screen scene correction data are displayed in the third display frame. Similarly, the first half-screen scene data and the second half-screen scene data rendered in Loop B by the rendering thread in FIG. 2A will be displayed in the fourth display frame in FIG. 2A.

Because the rendering thread and the asynchronous time warping thread are executed asynchronously in two different threads respectively, the rendering thread can start preparation for executing Loop B after the end of Loop A immediately, without waiting for the time warping process to complete. Compared with a conventional method for completing rendering and time warping processing in one thread, the display scene processing method in embodiments of the disclosure reduces the time of the rendering thread waiting time warping processing. Thus, the running efficiency of the rendering thread and the asynchronous time processing thread is reduced, and the total running time of the rendering thread and the asynchronous time warping thread is reduced.

Referring to FIG. 2B, in some embodiments, the sum of the execution time of Loop A of the rendering thread and the execution time of asynchronous time warping on the rendered data after Loop A may also be less than the time of one frame, for example, in FIG. 2B, under the condition that the amount of data to be processed is small and/or the performance of the processor is superior. In FIG. 2B, the first half-screen scene data and the second half-screen scene data rendered by the rendering thread in Loop A will be displayed one frame later (i.e., the second display frame in FIG. 2B).

Figure 3A:
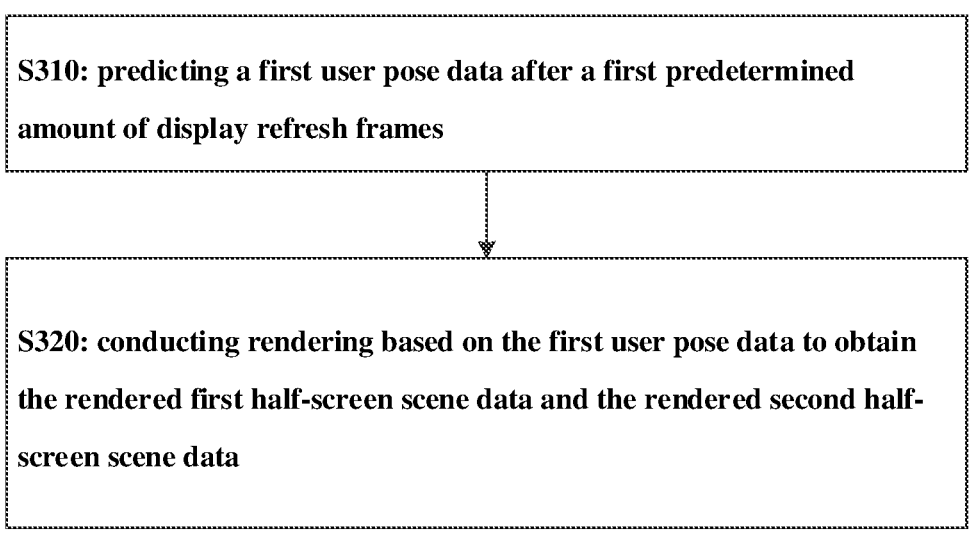
FIG. 3A is a flowchart illustrating a rendering thread for a display scene processing method according to at least one embodiment of present disclosure.
Figure 3B:
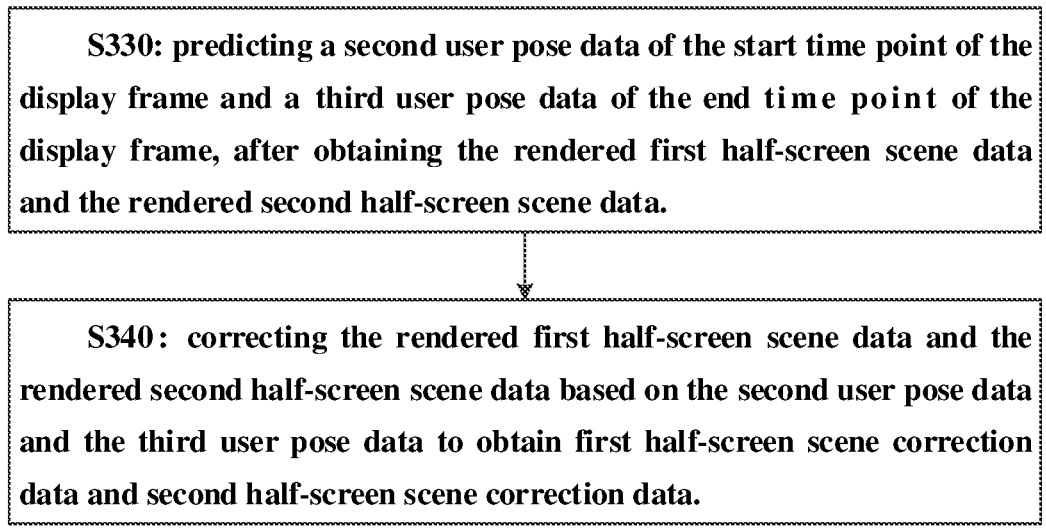
FIG. 3B is a flowchart illustrating an asynchronous time warping thread of a display scene processing method according to at least one embodiment of the present disclosure.

Referring to FIG. 3A, FIG. 3B, and FIG. 3C, some embodiments of adjusting the running processes of the rendering thread and the ATW thread in the case of FIG. 2A and FIG. 2B will be further described below.

FIG. 3A is a flowchart illustrating a rendering thread for a display scene processing method according to at least one embodiment of present disclosure.

The rendering thread in the display scene processing method according to at least one embodiment of the present disclosure as shown in FIG. 3A includes the following steps S310-S320. In step S310, first user posture data is predicted after a first predetermined amount of display refresh frame time elapses. In step S320, rendering is conducted based on the first user posture data to obtain the rendered first half-screen scene data and the rendered second half-screen scene data.

The prediction operation of step S310 may include, for example, obtaining the current state of the moving user's head, such as moving direction, speed, acceleration, and the like, by analyzing movement data fed back by motion sensors such as acceleration sensors, gyroscopes and the like, and further predicting the position the user will reach at the next predetermined time point, thereby predicting the image the user will see. For example, the first user posture data and other user posture data referred to in the following description may include any one of or a combination of a direction and an angle toward which the user is oriented, a movement direction, a movement angle, a speed, an acceleration, and the like. For example, in the embodiment of the present disclosure, in the prediction operation, the user posture after a given time can be calculated or predicted according to the current user posture and the historical data of the user posture, thereby the data of the user posture at the time to be displayed is obtained. Methods of calculation or prediction include, but are not limited to, prediction using neural networks.

Optionally, the first predetermined amount of display refresh frames is N+0.5 display refresh frames, where N is greater than or equal to 1. Herein, the term "display refresh frame" refers to the frame of the corresponding display device conducting scanning process or sweeping process for display, hereinafter also referred to as "frame".

Referring to FIG. 2A, the first user posture data may be the predicted user posture data at the intermediate time Tm of the third display frame.

The value of N may be different, according to the statistical results of the rendering time and the asynchronous time warping (ATW) processing time for one frame of display screen of the currently used virtual reality device, For example, referring to FIG. 2A, assuming that the sum of the duration of the processing Loop A and the duration of performing asynchronous time warping on the rendered data after Loop A is greater than the duration of one display frame, N may preferably be 2. As described above, the first half-screen scene data and the second half-screen scene data rendered by the rendering thread in Loop A will be displayed in two frames later (i.e., in the third display frame in FIG. 2A). When N is 2, the Loop A of the rendering thread can render the first half-screen scene data and the second half-screen scene data based on the first user posture data at the intermediate time Tm of the third display frame (i.e., 2.5 frames after the first vertical synchronization signal (the first Vsyne)), so that the user can see the scene that he/she wishes to see when the third display frame is displayed.

For another example, referring to FIG. 2B, assuming that the sum of the duration of the processing Loop A and the duration of performing asynchronous time warping on the rendered data after Loop A is less than the duration of one display frame, N may be 1 as an example. As described above, the first half-screen scene data and the second half-screen scene data rendered by the rendering thread in Loop A will be displayed one frames later (i.e., in the second display frame in FIG. 2B). When N is 1, the Loop A of the rendering thread can render the first half-screen scene data and the second half-screen scene data based on the first user posture data at the intermediate time (not shown) of the second display frame (i.e., 1.5 frames after the first vertical synchronization signal (the first Vsyne)), so that the user can see the image he wish to see when the third display frame is displayed.

The above value of N is only an example. The value of N can be a fixed value determined according to the performance of the CPU, or can also be dynamically adjusted based on the actual usage of the current virtual reality device. For example, in the case where the CPU of the virtual reality device has a large amount of computation to work on and/or other threads occupy a large amount of CPU resources, the rendering thread may take longer to process. In this case, the value of N can be dynamically adjusted to a larger value so that the rendered scene data is closer to the time when it should be displayed. Similarly, when the CPU of the virtual reality device has a small amount of computation to work on and/or other threads occupy a relative small amount of CPU resources, the value of N may be dynamically adjusted to a smaller value.

FIG. 3B is a flowchart illustrating an asynchronous time warping thread of a display scene processing method according to at least one embodiment of the present disclosure.

The asynchronous time warping thread in the display scene processing method shown in FIG. 3B includes the following steps S330-S340. In step S330, second user posture data of the start time point of the display frame and third user posture data of the end time point of the display frame are predicted after the rendered first half-screen scene data and the rendered second half-screen scene data are obtained. In step S340, the rendered first half-screen scene data and the rendered second half-screen scene data is corrected based on the second user posture data and the third user posture data to obtain first half-screen scene correction data and second half-screen scene correction data.

Optionally, the correction of the rendered first half-screen scene data and the rendered second half-screen scene data based on the second user posture data and the third user posture data, includes performing an interpolation calculation based on the second user posture data and the third user posture data to obtain first asynchronous time warping correction reference data, and then correcting the rendered first half-screen scene data and the rendered second half-screen scene correction data based on the first asynchronous time warping correction reference data.

Referring to FIG. 2A, the second user posture data may be the user posture data predicted for the start time point Ts of the third display frame. The third user posture data may be the user posture data predicted for the end time point Te of the third display frame.

The asynchronous time warping thread of the display scene processing method according to some embodiments of the present disclosure can correct the first half-screen scene data and the second half-screen scene data to be output more accurately. For example, in the process of outputting and displaying the first half-screen scene data and the second half-screen scene data to the screen through pixel voltage signals, pixels of the display are usually swept horizontally from left to right or from right to left one by one. Therefore, normally, the processing of pixels of the first half-screen can be completed in the first half frame duration, and the processing of pixels of the second half-screen can be completed in the second half frame duration. In such a case, by performing asynchronous time warping processing on the rendered first half-screen scene data and the rendered second half-screen scene data, the rendered first half-screen scene data can be corrected to be closer to the output display image in the first half frame duration, and the second half-screen scene data can also be corrected to be closer to the output display image in the second half frame duration. Thus the delay of the output picture is further reduced, which improves user experience.

Return to FIG. 2A, assuming that the sum of the duration of processing Loop A and the duration of performing asynchronous time warping on the rendered result of Loop A is greater than the duration of one display frame, as for the first half-screen scene data and the second half-screen scene data processed by Loop A and ATW threads, the output processing of the pixels for the corrected first half-screen scene data will be completed in the first half frame duration of the third display frame, while the output processing of the pixels for the corrected second half-screen scene data will be completed in the second half frame duration of the third display frame. Similarly, as for the first half-screen scene data and the second half-screen scene data processed by Loop B and ATW threads, the output processing of the pixels for the corrected first half-screen scene data will be completed in the first half frame duration of the fourth display frame, while the output processing of the pixels for the corrected second half-screen scene data will be completed in the second half frame duration of the fourth display frame. At this moment, the asynchronous time warping thread can predict the second user posture data for the start time point Ts (time) of the third display frame and the third user posture data of the end time point Te (time) for the third display frame. Then, according to the setting of the virtual reality device, the data of the user posture of each intermediate frame of the third display frame (e.g., Tm, Tm-1 and Tm-2 in FIG. 2A), which is the first asynchronous time warping correction reference data, is obtained by performing interpolation calculation on the second user posture data and the third user posture data. Based on the first asynchronous time warp correction reference data, the asynchronous time warp thread may warp the first half-screen scene data generated in Loop A of the rendering thread in FIG. 2A (the data is based on the intermediate time of the third display frame) onto the image to be displayed at the intermediate time of the first half frame duration of the third display frame. Likewise, the ATW thread may warp the second half-screen scene generated in Loop A of the rendering thread in FIG. 2A onto the image to be displayed at the intermediate time of the second half frame duration of the third display frame.

Similarly, in FIG. 2B, based on the first asynchronous time warp correction reference data, the asynchronous time warp thread may warp the first half-screen scene data generated in Loop A of the rendering thread in FIG. 2B (the data is based on the intermediate time of the second display frame) onto the image to be displayed at the intermediate time of the first half frame duration of the second display frame. Likewise, the ATW thread may warp the second half-screen scene generated in Loop A of the rendering thread in FIG. 2B onto the image to be displayed at the intermediate time of the second half frame duration of the second display frame. Similarly, the first half screen scene data generated in Loop B of the rendering thread of FIG. 2B (the data is based on the intermediate time of the third display frame) will be warped onto the image to be displayed at the intermediate time of the first half frame duration of the third display frame. Similarly, the second half-screen scene generated in Loop A of the rendering thread in FIG. 2B will be warped onto the image to be displayed at the intermediate time of the second half of the third display frame.

It should be noted that, since the time taken to execute the rendering thread is not a completely fixed value, it may take a relative long time to process a certain loop in the rendering thread. In this case, it may occur that the screen displayed in the M-th display frame is the first half-screen scene data and the second half-screen scene data rendered based on the data of the user posture of the M-k-th frame (k is greater than or equal to 1). At this time, the asynchronous time warping thread can correct the first half-screen scene data rendered based on the data of the user posture of the M-k th frame to the image to be output at the first half frame duration of the M-th frame, and correct the second half-screen scene data to the picture to be output at the second half frame duration of the M-th frame.

FIG. 3C is a flowchart illustrating an asynchronous time warping thread of a display scene processing method according to at least one embodiment of the present disclosure.

The asynchronous time warping thread in the display scene processing method shown in FIG. 3C includes the following steps S331-S361. In step S331, data of a user posture of the quarter frame after the start time point of the display frame is predicted to obtain a second asynchronous time warping correction reference data for the first half-screen. In step S341, the rendered first half-screen scene data is corrected based on the second asynchronous time warp correction reference data to obtain a first half-screen scene correction data. In step S351, the data of the user posture of three-quarters of the frames after the start time point of the display frame is predicted to obtain a third asynchronous time warping correction reference data for the second half-screen. In step S361, the rendered second half-screen scene data is corrected based on the third asynchronous time warping correction reference data to obtain a second half-screen scene correction data.

Compared with the asynchronous time warping thread in the display scene processing method shown in FIG. 3B, the asynchronous time warping in FIG. 3C includes a methodology of acquiring user posture data at absolute time instead of interpolation operation, and thereby the amount of operation is reduced.

Referring to FIG. 2A, it is assumed that the output processing of the pixels for the corrected first half-screen scene data will be completed in the first half frame duration of the third display frame. In this case, the rendered first half-screen scene image, which is based on user posture data of about 1.5 frames from the first vertical synchronization signal, can be directly corrected to the first half-screen scene correction image that the user should see at 1.25 frames from that vertical synchronization signal. Meanwhile, the rendered second half-screen scene image, which is based on user posture data of about 1.5 frames from the first vertical synchronization signal, can be directly corrected to the second half-screen scene correction image that the user should see at 1.75 frames from the vertical synchronization signal. Therefore, the scene images output by the first half-screen and the second half-screen are closer to the scene expected by the user, and the inconsistence of the picture is reduced.

In addition, anti-distortion processing could be applied to the first half-screen scene correction data and the second half-screen scene correction data before being output to the screen.

Anti-distortion processing is a technique used to correct distorted images into normal images. Specifically, in general, in the application scene of virtual reality, especially in the head-mounted virtual display device, in order to obtain a larger field of view angle, lens need to be installed in front of the display screen. The usage of this lens not only brings a larger field of view angle, but also brings distortion to the displayed image. Therefore, in order to display an image without distortion on the first half screen and the second half screen, it is proposed in the present disclosure to perform anti-distortion processing on the first half screen scene correction data and the second half screen scene correction data to eliminate the influence brought by the lens, thus making the image seen by the user more real.

Optionally, the anti-distortion processing may be at least one of vertex displacement-based anti-distortion processing, mesh-based anti-distortion processing and pad-based anti-distortion processing.

For example, in the pad-based anti-distortion processing, texture is rendered on pixels in the first half-screen scene image and the second half-screen scene image through secondary rendering process, then the texture is processed by the pad (pixel) shader and/or renderer (for example, relevant routine in Android system), and each pixel is moved inward toward the center that the user's eyes focus on. Thus, the lens distortion problem is solved.

For example, in the mesh-based anti-distortion processing, anti-distortion processing is no longer conducted on each pixel, but is conducted on the vertices of one or more meshes in the mesh, thus improving the speed of anti-distortion processing.

For example, in vertex displacement-based anti-distortion processing, scene data is processed by optimizing shaders and/or renderers (e.g., related routines in Android system), instead of rendering scene data twice, thus processing anti-distortion faster.

Generally, for the first half-screen and the second half-screen, the adjustment mode and adjustment matrix of the distortion network are the same or similar. Therefore, it is not necessary to calculated more than one distortion network for the first half-screen scene output data and the second half-screen scene output data. Compared with performing anti-distortion on the first half-screen scene output data and the second half-screen scene output data separately, there would be less time in processing time when calculating the distortion network in one thread and then performing anti-distortion processing on both the first half-screen scene output data and the second half-screen scene output data, thus, it is more conducive to reducing image delay.

Figure 4:
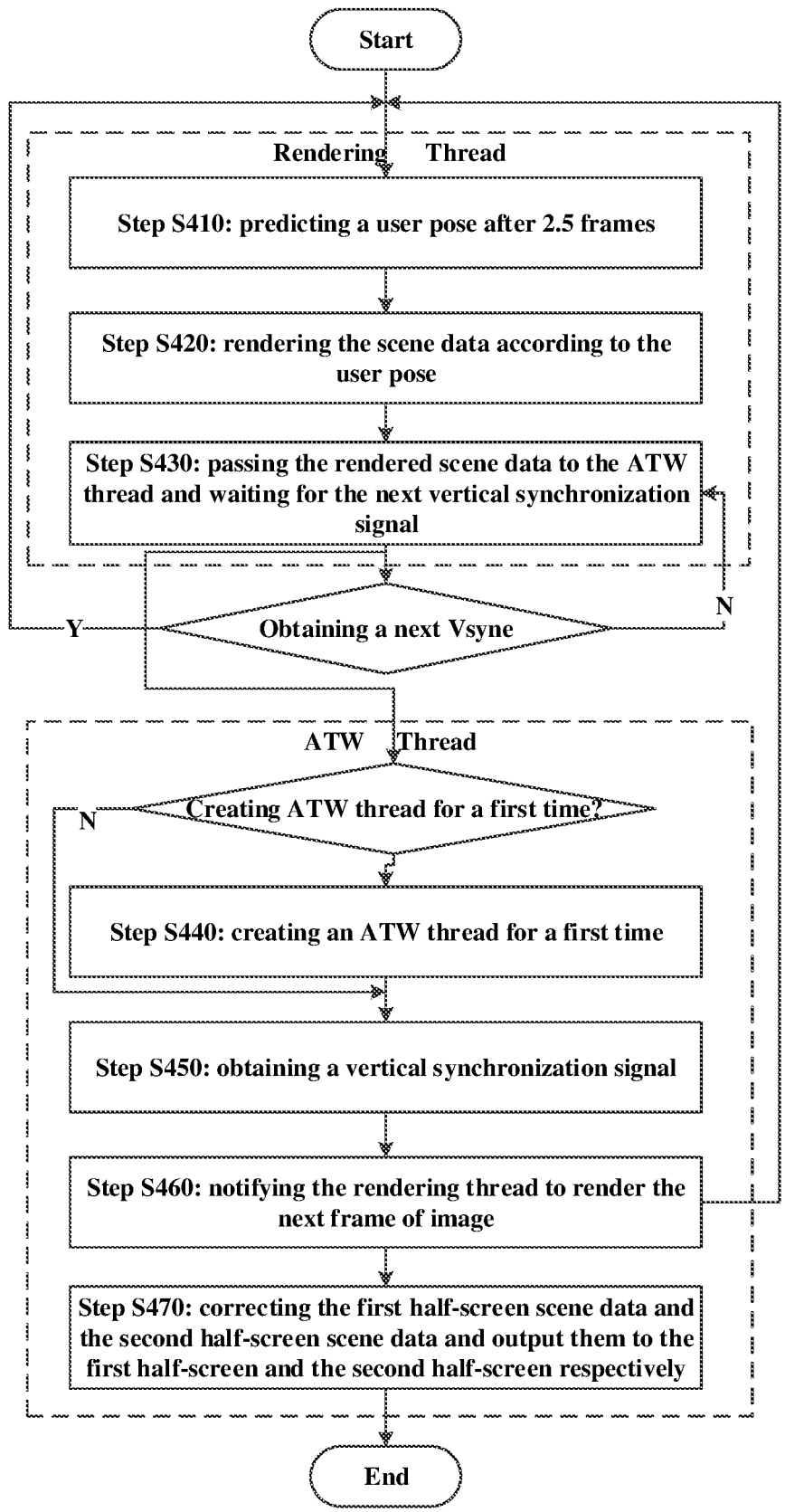
FIG. 4 is a flowchart illustrating a display scene processing method according to at least one embodiment of the present disclosure.

FIG. 4 is a flowchart illustrating a display scene processing method according to at least one embodiment of the present disclosure.

Referring to FIG. 4, steps for rendering thread and the corresponding ATW thread will be schematically explained. The rendering thread includes at least the following three steps S410-S430.

In step S410, a user posture after 2.5 frames is predicted.

Optionally, step S410 may be processed by calling a corresponding program, such as SensorPredicted, which is a routine for handling user posture prediction in Android system. It is assumed that the total time required for the rendering thread and the asynchronous time warping thread to process the scene data corresponding to the user posture is greater than the time of one display frame. Referring to FIG. 2A, because the display frame of the first half screen corresponding to Loop A for rendering the first half screen data starts sweeping after 2 frames, the timing at half frame (0.5 frame) after the start of the display frame is selected for rendering, which helps the average prediction of the user's action in the actual display frame process. Therefore, in order to better make the scene displayed in the display frame closer to the scene faced by the user at the actual moment, it may require to predict the user posture after at least 2.5 frames from the current Vsyne for subsequent rendering processing.

In step S420, a scene data is rendered according to the user posture.

Optionally, step S420 can be processed by calling a corresponding program, such as DrawTwoEyes, which is a routine for rendering scenes seen by left and right eyes in Android system.

Referring to FIG. 2A, in Loop A of the rendering thread, scene data of the first half screen and the second half screen to be displayed in the third display frame are rendered based on the data of the user posture after 2.5 frames from the present Vsyne obtained in step S410.

In step S430, the rendered scene data is passed to the ATW thread and waiting for the next vertical synchronization signal (Vsyne).

Optionally, step S430 may be processed by calling a corresponding program, such as WarpSwap, which is a routine for handling communications between rendering threads and asynchronous time warp threads in Android system.

Continued to reference to FIG. 4, the ATW thread includes at least the following steps S440-S470.

In step S440, an ATW thread is created for a first time.

If it is determined that an ATW thread has never been executed, the ATW thread needs to be created first, otherwise, the step of creating an ATW thread is skipped and the ATW thread that has been created is executed. In addition, when an ATW thread is created for the first time, the ATW thread needs to be initialized by calling the corresponding program (e.g., WarpThreadInit) (step S440). If the ATW thread is not created for a first time, step S450 may be entered.

In step S450, a vertical synchronization signal is obtained.

Optionally, step S450 may be processed by calling a corresponding program, such as the GetVsyne in the Android system. By running GetVsyne, the vertical synchronization signal, for example a signal generated by the display driving device, can be obtained to determine which display frame (e.g., the time of how many frames after a reference timing (the timing of a previously selected vertical synchronization signal) is for present moment.

The rendering thread and the ATW thread need to process scene data of the same half-screen based on the same vertical synchronization signal. That is to say, synchronization is realized through the vertical synchronization signal. Therefore, the ATW thread needs to know which vertical synchronization signal the rendering thread is based on so as to determine the amount of data that needs to be corrected for the scene data rendered by the rendering thread. Of course, information about the vertical synchronization signal may also be directly notified to the ATW thread by the rendering thread.

In step S460, the rendering thread is notified to render the next frame of image.

Optionally, in step S460, the ATW thread can inform the rendering thread that it has acknowledged the rendered scene data to be corrected and the vertical synchronization signal via, for example, the Pthread_cond_signal signal, so that the rendering thread can know that it can render the scene data of the next frame. This step is to prevent the rendering thread from starting the rendering of the next frame before the rendering data is completely transmitted to the ATW thread, which may cause data loss/error. Meanwhile, step S460 may also proceeds to the next step S470.

In Step S470, the first half-screen scene data and the second half-screen scene data are corrected and output to the first half-screen and the second half-screen respectively.

Optionally, step S470 may be processed by calling a corresponding program, such as WarpToScreen, a routine for inputting scene data to a screen in Android system, to display images on the first half screen and the second half screen.

As described above, the ATW thread can correct the rendered first half-screen scene data to an output display image closer to the first half frame duration, and correct the second half-screen scene data to an output display image closer to the second half frame duration, thus further reducing the delay of the output picture and improving the user experience.

In the above process, under the refresh display mechanism of Android system, it takes a duration for at least 3 frames to obtain a user's posture, to predict the user's posture, to process rendering and ATW, and to display the final image. If the time can be further compressed, the problem of image delay will be further reduced and a better virtual reality display effect or augmented reality display effect will be provided.

The embodiments of the present disclosure also provides a processing method of the display scene to further optimize the delay of the output image and provide better virtual reality display effect or augmented reality display effect.

A method applicable to virtual reality scene output according to at least one embodiment of the present disclosure will now be further described with references from FIG. 5A to FIG. 10.

Figure 5A:
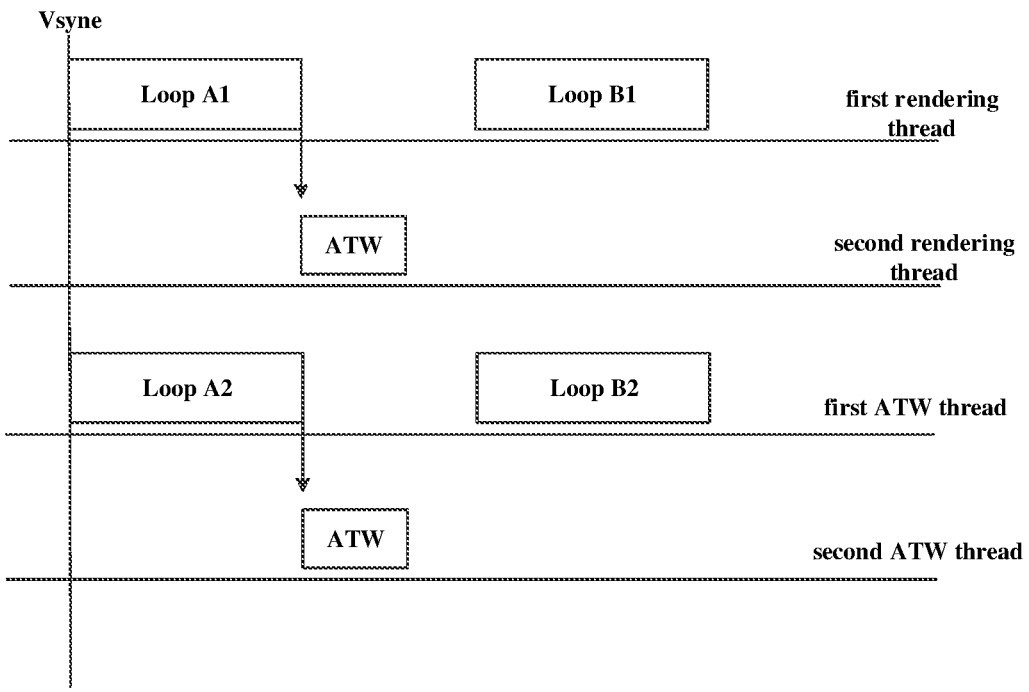
FIG. 5A is a diagram illustrating a display scene processing method according to at least one embodiment of present disclosure.
Figure 5B:
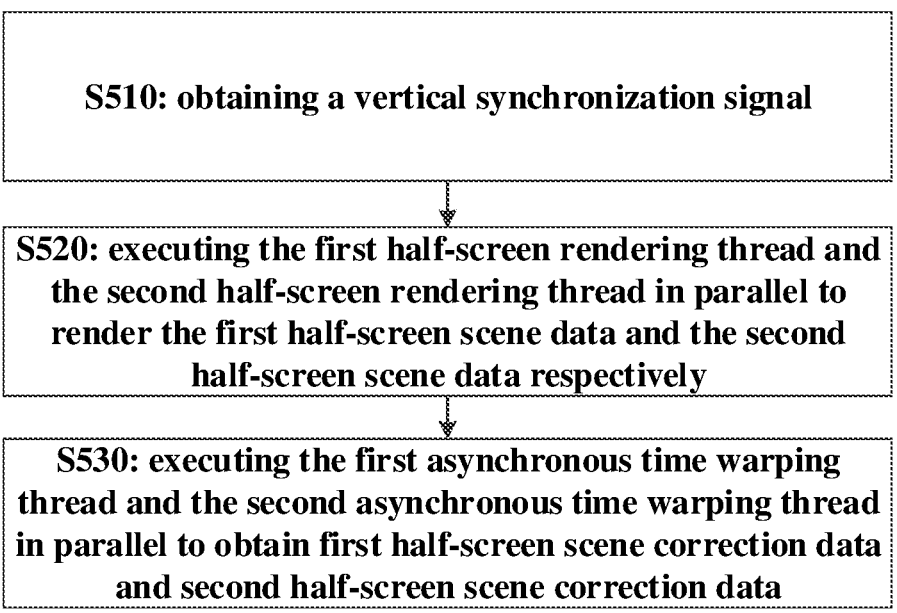
FIG. 5B is a flowchart illustrating a display scene processing method according to at least one embodiment of present disclosure.

FIG. 5A is a diagram illustrating a display scene processing method according to at least one embodiment of present disclosure. FIG. 5B is a flowchart illustrating a display scene processing method according to at least one embodiment of present disclosure.

Referring to FIG. 5A, the display scene processing method may include four threads running in parallel, a first half-screen scene rendering thread (referring to the first rendering thread in FIG. 5A), a second half-screen scene rendering thread (referring to the second rendering thread in FIG. 5A), a first asynchronous time warping thread (referring to the first ATW thread in FIG. 5A), and a second asynchronous time warping thread (referring to the second ATW thread in FIG. 5A).

The first half-screen rendering thread and the second half-screen rendering thread render the first half-screen scene data and the second half-screen scene data in parallel according to a vertical synchronization signal, thus the picture that the user expects to see is obtained. By running the first half-screen rendering thread and the second half-screen rendering thread in parallel, the time to process rendering can be greatly reduced. It will be advantageous in virtual reality devices including multi-core processors. For example, the running time of Loop A1 and Loop A2 in FIG. 5A will be much smaller than the running time of Loop A in FIG. 1A.

The first half-screen rendering thread sends the rendered first half-screen scene data to the first asynchronous time warping thread. Similarly, the second half-screen rendering thread sends the rendered second half-screen scene data to the second asynchronous time warping thread.

The first asynchronous time warping thread can correct the rendered first half-screen scene data to obtain the first half-screen scene output data. Similarly, the second asynchronous time warping thread can correct the rendered second half-screen scene data to obtain the second half-screen scene output data. More specifically, the first asynchronous time warping thread (or the second asynchronous time warping thread) may generate one or more intermediate frames according to the rendered first half-screen scene data (or the rendered second half-screen scene data). Under the condition that rendering and outputting of data cannot be completed in the duration of one display frame, the intermediate frame formed by asynchronous time warping will be output to the display to reduce the vertigo of the user.

Referring to FIG. 5B, the display scene processing method according to the embodiment of the present disclosure includes the following steps S510 to S530. Step S510: obtaining a vertical synchronization signal. In step S520, the first half-screen rendering thread and the second half-screen rendering thread are executed in parallel to render the first half-screen scene data and the second half-screen scene data respectively. In step S530, the first asynchronous time warping thread and the second asynchronous time warping thread are executed in parallel to obtain first half-screen scene correction data and second half-screen scene correction data.

For example, the display scene processing method according to the embodiment of the present disclosure enables the display device to complete the rendering operation of the first half-screen scene data and the second half-screen scene data in a short time by dividing the rendering thread into a first half-screen rendering thread and a second half-screen rendering thread and executing the two threads in parallel, which may otherwise take twice as long to complete.

For example, optionally, the first half-screen rendering thread and the second half-screen rendering thread are allocated to different processors of the display device or different cores of the processors for parallel execution, thereby further shortening the running time of the two threads.

Optionally, the rendered first half-screen scene data and the rendered second half-screen scene data are respectively corrected in parallel through asynchronous time warping, and the two asynchronous time warping threads can also be distributed to multiple processors or multiple cores of the processors for parallel execution, thereby further shortening the running time of asynchronous time warping processing.

Figure 6:
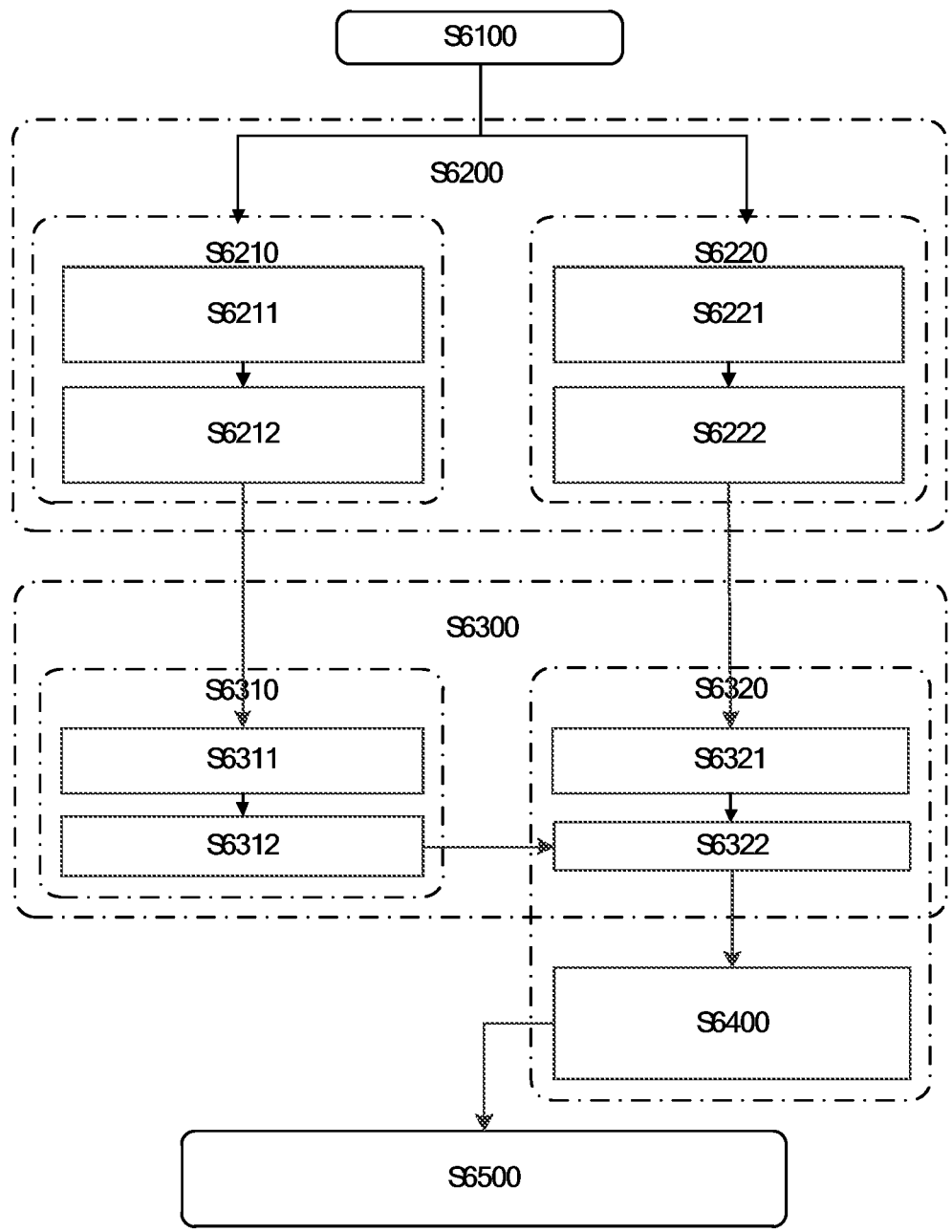
FIG. 6 is a flowchart illustrating a display scene processing method according to at least one embodiment of the present disclosure.

Next, a method applicable to virtual reality scene output according to other embodiments of the present disclosure is further described with the reference of FIG. 6.

FIG. 6 is a flowchart showing another display scene processing method according to another embodiment of the present disclosure.

Referring to FIG. 6, similarly, the display scene processing method according to the embodiment of the present disclosure is also used for a virtual reality display device including a left-eye display screen and a right-eye display screen, for example. The display scene processing method comprises the following steps S6100-S6500.

In step S6100, a vertical synchronization signal is obtained.

In step S6200, a first half-screen rendering thread and a second half-screen rendering thread are executed in parallel, based on the vertical synchronization signal, to render a first half-screen scene data and a second half-screen scene data respectively.

In step S6300, the first asynchronous time warping thread and the second asynchronous time warping thread is executed in parallel to obtain a first half-screen scene correction data and a second half-screen scene correction data.

In step S6400, anti-distortion processing is performed on the second half-screen scene correction data and the first half-screen scene correction data to obtain the second half-screen scene output data and the first half-screen scene output data.

In step S6500, the first half-screen scene output data and the second half-screen scene output data are output to the first half-screen display screen and the second half-screen display screen respectively for display in the display frame.

In this method, similarly, at first, a vertical synchronization signal is acquired, and then the first half-screen rendering thread and the second half-screen rendering thread are started to be executed in parallel in one frame scanning time based on the vertical synchronization signal to render the first half-screen scene data and the second half-screen scene data respectively. The first half-screen scene data and the second half-screen scene data are, for example, pre-stored image data read from a storage device.

With continued reference to FIG. 6, in an example of the method, step S6200 further includes steps S6210 and S6220, wherein a first half-screen rendering thread is executed in step S6210 and a second half-screen rendering thread is executed in step S6220.

For example, step S6210 may further include step S6211 and step S6212. In Step S6211, the fourth user posture data after the time of M+0.5 display refresh frame from the vertical synchronization signal is predicted, where M is greater than or equal to 1. In step S6212, rendering is conducted based on the fourth user posture data to obtain rendered first half-screen scene data.

Optionally, since the first half-screen rendering thread only needs to render the scene data of the first half-screen, the processing time is shorter than the processing time of rendering the scene data of the two screens in the same thread as described above with reference to FIG. 1A, FIG. 2A and FIG. 2B. According to statistics, the duration of rendering processing and asynchronous time processing for a half-screens are usually less than the duration of one frame. The rendered and corrected first half-screen scene data can be output in the next display refresh frame from the obtained vertical synchronization signal. Therefore, the first half-screen rendering thread only needs to predict the user posture after 1.5 frames from the vertical synchronization signal, which is used in the subsequent rendering thread. At this time, M is preferably 1.

Step S6300 includes step S6310 and step S6320. In step S6310, the rendered first half-screen scene data is corrected, while in step S6320, the rendered second half-screen scene data is corrected.

For example, step S6310 may further include sub-steps S6311 and S6312 as follows. In step S6311, the rendered first half-screen scene data is corrected through asynchronous time warping. In step S6312, the first half-screen scene correction data is transferred to the second half-screen scene correction thread.

For example, step S6220 may further include sub-steps S6221 and S6222 as follows. In step S6221, seventh user posture data is predicted after the time of K+0.5 display refresh frame, where K is greater than or equal to 1. In step S6222, rendering is conducted based on the seventh user posture data to obtain rendered second half-screen scene data. Optionally, similar to step S6212, K may preferably be 1.

The values of N, M and K mentioned above may be the same or different, which is not limited by present disclosure.

Optionally, in step S6211 and step S6221, the rendering based on the fourth user posture data or the seventh user posture data may be performed with a MRT technology.

For example, step S6320 may further include sub-steps S6321 and S6322 as follows. In step S6321, the rendered second half-screen scene data is corrected through asynchronous time warping. In step S6322, the first half-screen scene correction data is received.

Now, a method of correcting rendered scene data by asynchronous time warping according to at least one embodiment of the present disclosure will be further described with reference to FIG. 7A and FIG. 7B.

Figure 7A:
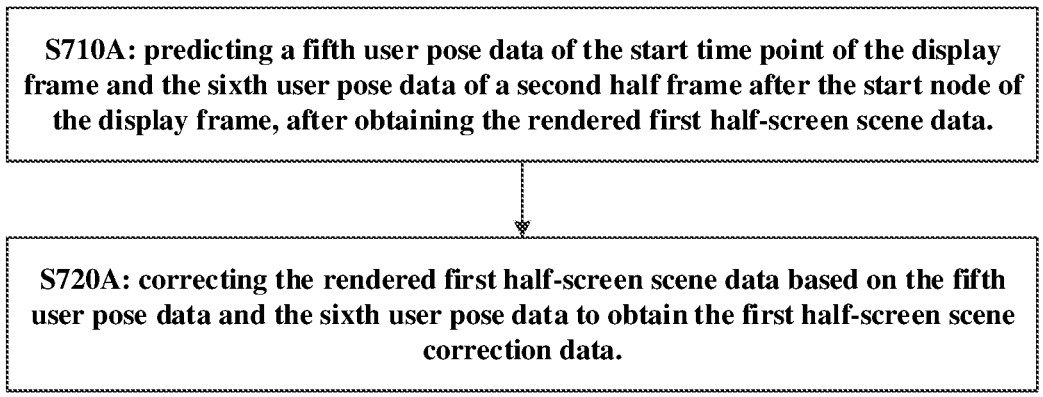
FIG. 7A is a flowchart illustrating the correction of rendered first half-screen scene data by asynchronous time warping in a display scene processing method according to at least one embodiment of the present disclosure.
Figure 7B:
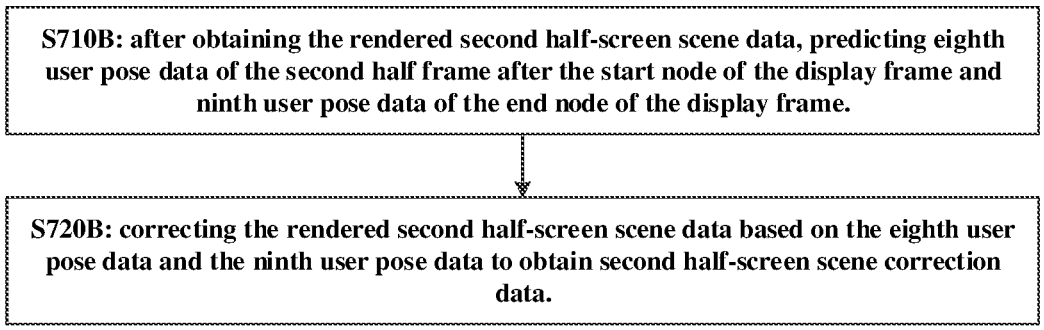
FIG. 7B is a flowchart illustrating the correction of rendered second half-screen scene data by asynchronous time warping in a display scene processing method according to at least one embodiment of the present disclosure.

FIG. 7A is a flowchart illustrating the correction of rendered first half-screen scene data by asynchronous time warping in a display scene processing method according to at least one embodiment of the present disclosure; and FIG. 7B is a flowchart illustrating the correction of rendered second half-screen scene data by asynchronous time warping in a display scene processing method according to at least one embodiment of the present disclosure.

For example, referring to FIG. 7A, the step for correcting the rendered first half-screen scene data by asynchronous time warping (e.g., step S6311 of the embodiment in FIG. 6) may further include sub-steps S710A and S720A as follows. In step S710A, fifth user posture data of the start time point of the display frame and sixth user posture data of a second half frame after the start time point of the display frame are predicted, after obtaining the rendered first half-screen scene data. In step S720A, the rendered first half-screen scene data are corrected based on the fifth user posture data and the sixth user posture data to obtain the first half-screen scene correction data.

Optionally, in order to correct the rendered first half-screen scene data based on the fifth user posture data and the sixth user posture data, interpolation calculation may be performed on the fifth user posture data and the sixth user posture data to obtain fourth asynchronous time warping correction reference data for the first half-screen, and then the rendered first half-screen scene data is corrected based on the fourth asynchronous time warping correction reference data.

According to at least one embodiment of the present disclosure, assuming that pixel processing of the first half-screen is completed in the first half frame time duration during which frequency sweep output is performed, in such a case, the rendered first half-screen scene data can be corrected to a display image closer to the first half frame duration of the predetermined display frame when asynchronous time processing is performed on the rendered first half-screen scene data. For example, by predicting and performing an interpolation calculation on the fifth user posture data of the start time point of the display frame and the sixth user posture data of the second half frame duration after the start time point of the display frame, user posture data of about 1.25 frames from the vertical synchronization signal in step S6100 can be obtained. The interpolation calculation may be, for example, preforming calculation on the fifth user posture data and the sixth user posture data using a predetermined interpolation function to obtain their intermediate values, i.e. the first asynchronous time warping correction reference data. For example, the intermediate value may be the average of them, i.e. the interpolation function is a linear function.

Through asynchronous time processing, the rendered first half-screen scene image, which is based on user posture data of about 1.5 frames from the vertical synchronization signal, can be corrected to the first half-screen scene correction image that the user should see 1.25 frames from the vertical synchronization signal. Therefore, the scene image output by the first half-screen is closer to the picture expected by the user, and the inconsistency of the picture is reduced.

For example, referring to FIG. 7B, the step for correcting the rendered second half-screen scene data by asynchronous time warping (e.g., step S6321 of the embodiment in FIG. 6) may further include sub-steps S710B and S720B as follows. In step S710B, after obtaining the rendered second half-screen scene data, eighth user posture data of the second half frame duration after the start time point of the display frame and ninth user posture data of the end time point of the display frame are predicted. In step S720B, the rendered second half-screen scene data is corrected based on the eighth user posture data and the ninth user posture data to obtain second half-screen scene correction data.

Optionally, in order to correct the rendered second half-screen scene data based on the eighth user posture data and the ninth user posture data, interpolation calculation may be performed on the eighth user posture data and the ninth user posture data to obtain sixth asynchronous time warping correction reference data for the second half-screen, and then the rendered second half-screen scene data is corrected based on the sixth asynchronous time warping correction reference data.

According to at least one embodiment of the present disclosure, assuming that pixel processing of the second half-screen is completed in the second half frame duration, in such a case, the rendered second half-screen scene data can be corrected to a display image closer to that should be displayed in the second half frame duration of the predetermined display frame when asynchronous time processing is performed on the rendered second half-screen scene data. For example, by predicting and performing interpolation calculation on the eighth user posture data of the second half frame after the start time point of the display frame and the ninth user posture data of the end time point of the display frame, user posture data of about 1.75 frames from the vertical synchronization signal in step S6100 can be obtained.

Through asynchronous time warping processing, the rendered second half-screen scene image, which is based on user posture data of about 1.5 frames from the vertical synchronization signal, can be corrected to the second half-screen scene correction image that the user should see 1.75 frames from the vertical synchronization signal. Therefore, the scene image output by the second half-screen is closer to the picture expected by the user, and the inconsistence of the picture is reduced.

Now, a method of correcting rendered scene data by asynchronous time warping according to at least one embodiment of the present disclosure will be further described with reference to FIG. 8A and FIG. 8B.

FIG. 8A is a flowchart illustrating the correction of rendered first half-screen scene data by asynchronous time warping in a display scene processing method according to at least one embodiment of the present disclosure; FIG. 8B is a flowchart illustrating the correction is a flowchart illustrating the correction of rendered second half-screen scene data by asynchronous time warping in a display scene processing method according to at least one embodiment of the present disclosure.

For example, referring to FIG. 8A, the step for correcting the rendered first half-screen scene data by asynchronous time warping (e.g., step S6311 of the embodiment in FIG. 6) may further include sub-steps S810A and S820A as follows. In step S810A, data of a user posture of the quarter frame after the start time point of the display frame is predicted to obtain a fifth asynchronous time warping correction reference data for the first half-screen. In step S820A, the rendered first half-screen scene data is corrected by asynchronous time warping based on the fifth asynchronous time warping correction reference data to obtain first half-screen scene correction data.

According to the embodiment of the present disclosure, it is assumed that pixel processing of the first half-screen is completed in the first half frame duration. In such a case, when asynchronous time processing is performed on the rendered first half-screen scene data, the rendered first half-screen scene data can be corrected to an output display image closer to the first half frame duration of the predetermined display frame. For example, the rendered first half-screen scene image, which is based on user posture data of about 1.5 frames from the first vertical synchronization signal, can be directly corrected to the first half-screen scene correction image that the user should see at 1.25 frames from the vertical synchronization signal. Therefore, the scene image output by the first half-screen is closer to the picture expected by the user, and inconsistence of pictures is reduced.

For example, referring to FIG. 8B, the step for correcting the rendered second half-screen scene data by asynchronous time warping (e.g., step S6321 of FIG. 6) may further include sub-steps S810B and S820B as follows. In step S810B, data of a user posture of three-quarters of frames after the start time point of the display frame is predicted to obtain seventh asynchronous time warp correction reference data for the second half-screen. In step S820B, the rendered second half-screen scene data is corrected based on the seventh asynchronous time warping correction reference data to obtain a second half-screen scene correction data.

According to the embodiment of the present disclosure, it is assumed that pixel point processing of the second half screen is completed in the second half frame duration. In such a case, when asynchronous time processing is performed on the rendered second half-screen scene data, the rendered second half-screen scene data can be corrected to an output display image closer to that should be displayed in the second half frame duration of the predetermined display frame. For example, the rendered first half-screen scene image, which is based on user posture data of about 1.5 frames from the second vertical synchronization signal, can be directly corrected to the second half-screen scene correction image that the user should see at 1.75 frames from the vertical synchronization signal. Therefore, the scene image output by the second half-screen is closer to the picture expected by the user, and inconsistence of pictures is reduced.

A method applicable to virtual reality scene output according to an embodiment of the present disclosure will now be further described with reference to FIG. 9 and FIG. 10.

Figure 9:
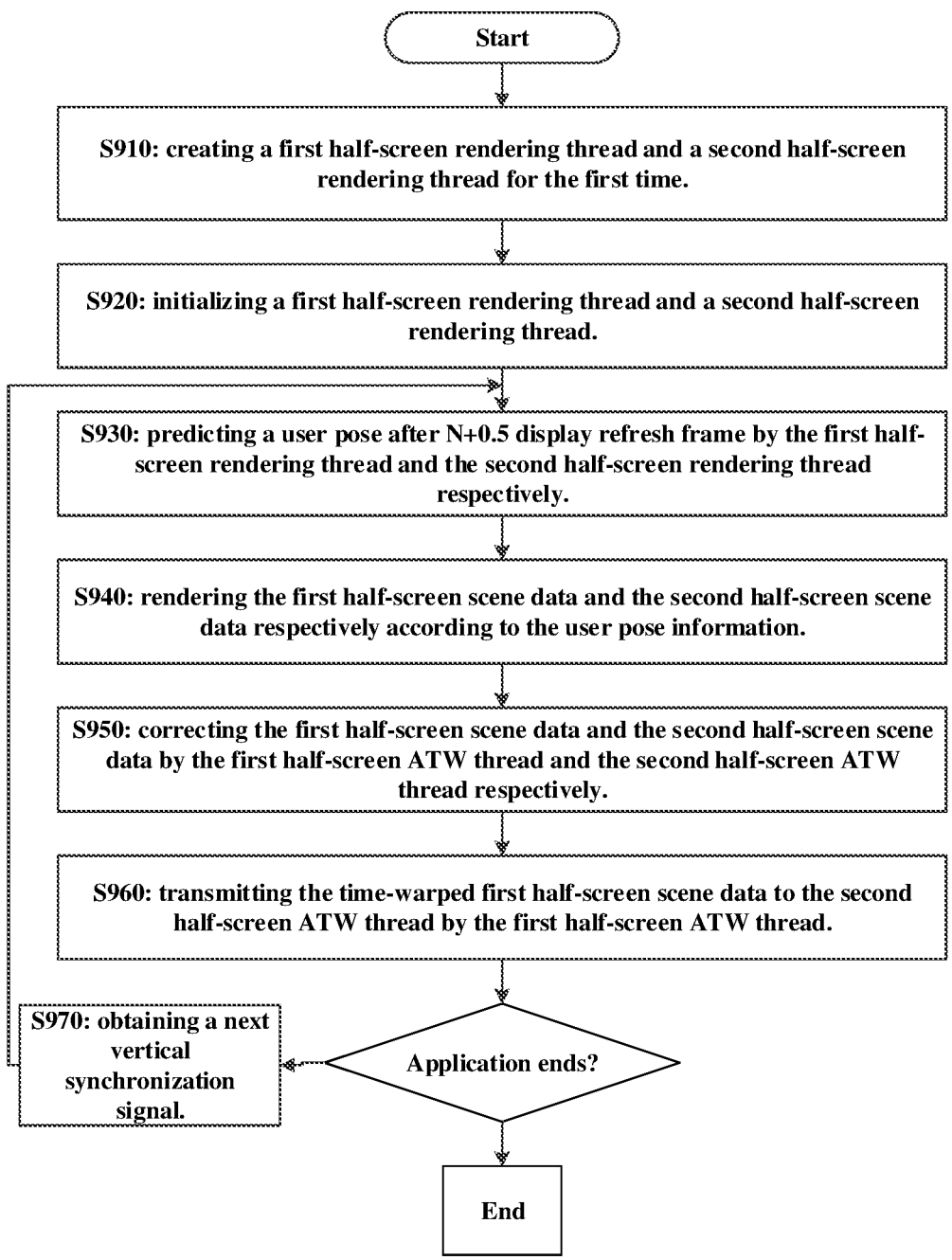
FIG. 9 is a flowchart illustrating a display scene processing method according to at least one embodiment of the present disclosure.
Figure 10:
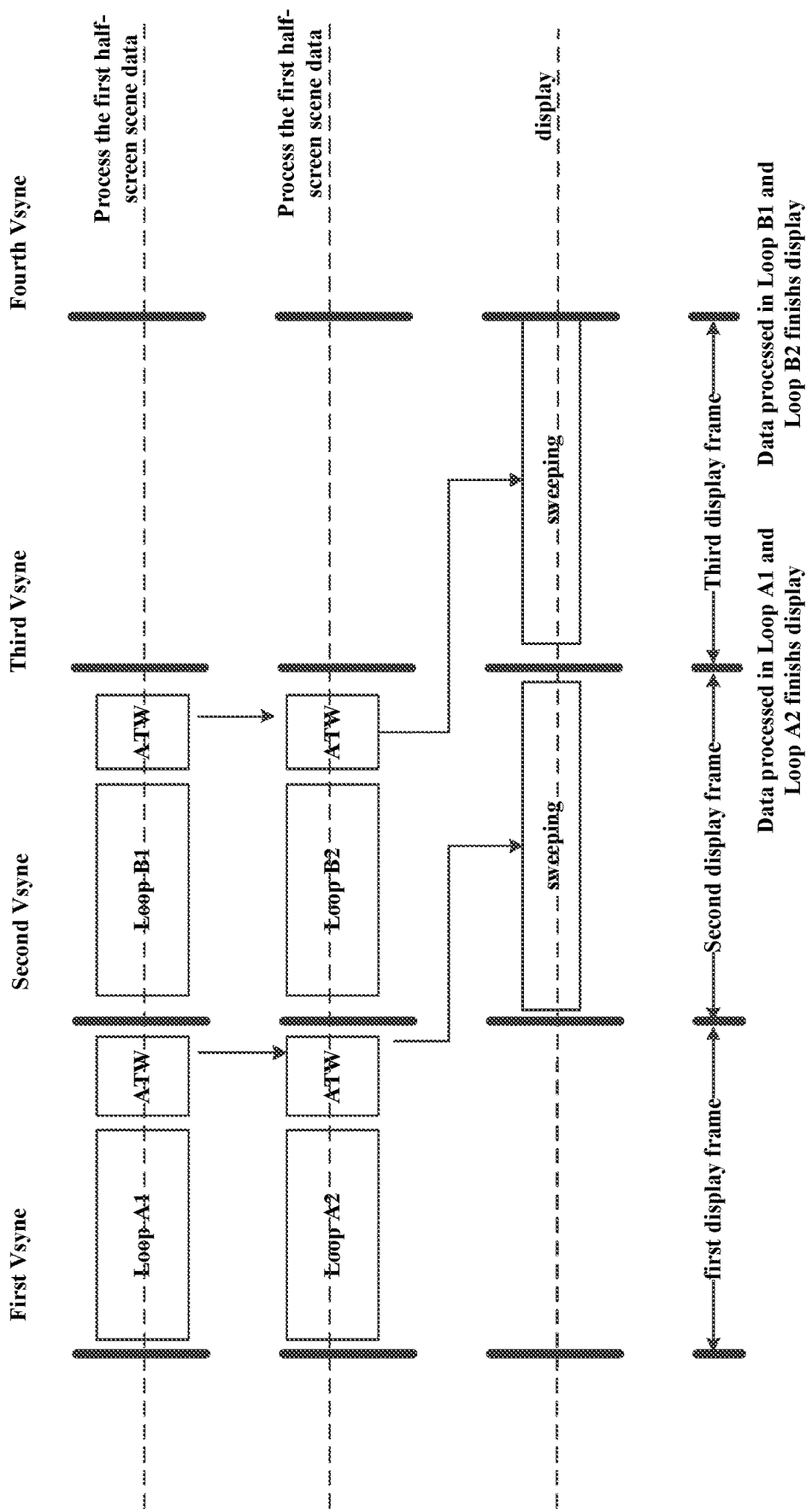
FIG. 10 is a diagram illustrating a display scene processing method according to at least one embodiment of present disclosure.

FIG. 9 is a flowchart showing another display scene processing method according to another embodiments of the present disclosure, FIG. 10 is a diagram showing another display scene processing method according to another embodiments of the present disclosure.

Referring to FIG. 9, a display scene processing method according to another embodiment of the present disclosure may include a rendering thread and an asynchronous time warping thread (hereinafter referred to as ATW thread).

Meanwhile, referring to FIG. 10, Loop A1 of the first half-screen rendering thread, Loop A2 of the second half-screen rendering thread, the asynchronous time warping thread ATW for the rendered first half-screen scene data, and the asynchronous time warping thread ATW for the rendered second half-screen scene data are performed in parallel within a frame time after the first vertical synchronization signal.

In a frame time after the second vertical synchronization signal, screen sweeping of the first half-screen and the second half-screen is performed based on the display data obtained by the aforementioned Loop A1, Loop A2 and the two ATW threads. Starting from obtaining the user's posture, predicting the user's posture, performing rendering and ATW, until the final image is displayed to the end of the screen would take two frames. Compared with the method of serially executing the first half-screen rendering thread and the second half-screen rendering thread, this can reduce the time by at least 1 frame.

Referring to FIG. 9, the rendering thread includes at least the following steps S910-S940.

In step S910, a first half-screen rendering thread and a second half-screen rendering thread are created for the first time.

Similarly, in the method of present embodiment, at first, the vertical synchronization signal (that is, the first vertical synchronization signal shown in FIG. 10) is obtained. Herein, the first half-screen may be a screen that displays an image seen by the user's left eye, and the second half-screen may be a screen that displays an image seen by the user's right eye. Of course, the meanings of the first half-screen and the second half-screen can be interchanged.

Optionally, step S910 can be processed by calling a corresponding program, such as the routine Create in Android system for creating threads.

In step S920, a first half-screen rendering thread and a second half-screen rendering thread are initialized.

Optionally, step S920 can be processed by calling a corresponding program, such as the routine Init for initializing threads in Android system.

If the first half-screen rendering thread and the second half-screen rendering thread have been previously created, steps S910 and S920 may be skipped, and the step of running the first half-screen rendering thread and the second half-screen rendering thread may be directly entered.

In step S930, a user posture after N+0.5 display refresh frame is predicted by the first half-screen rendering thread and the second half-screen rendering thread respectively.

Optionally, step S930 can be processed by calling a corresponding program, such as the routine SensorPredicted in Android system for predicting user posture data.

Referring to FIG. 10, it is assumed that the rendering thread starts subsequent rendering processing after obtaining the first vertical synchronization signal. Since the first half-screen rendering thread and the second half-screen rendering thread only need to render the scene data of the half-screen, the processing time is shorter than that of rendering the scene data of the two screens in the same thread. The duration of rendering processing and asynchronous time processing may be less than the duration of a display frame. Therefore, the rendered data obtained by the first half-screen rendering thread in Loop A1 and the second half-screen rendering thread in Loop A2 can be displayed in the second display frame. Therefore, Loop A1 of the first half-screen rendering thread and Loop A2 of the second half-screen rendering thread only need to predict the user posture after 1.5 frames which may be used in the subsequent processing.

In step S940, the first half-screen scene data and the second half-screen scene data are rendered respectively according to the user posture information.

Optionally, step S940 can be processed by calling a corresponding program, such as the routine DrawTwoEyes in Android system for rendering scene data.

Referring to FIG. 10, in Loop A1 of the first half-screen scene rendering thread, the first half-screen scene data to be displayed in the second display frame is rendered based on the data of the user posture after 1.5 frames obtained in step SensorPredicted. In Loop A2 of the second half-screen scene rendering thread, the second half-screen scene data to be displayed in the second display frame is rendered based on the data of the user posture after 1.5 frames obtained in step SensorPredicted.

With continued reference to FIG. 9, the ATW thread includes at least the following steps S950-S960.

In step S950, the first half-screen scene data and the second half-screen scene data are corrected by the first half-screen ATW thread and the second half-screen ATW thread respectively.

Optionally, step S950 may be processed by calling a corresponding program, such as the routine TimeWarp in Android system for correcting scene data through asynchronous time warping.

As described above, assuming that pixel processing of the first half-screen is completed in the first half frame duration, the first half-screen scene image after rendering process (which is based on user posture data of about 1.5 frames from the vertical synchronization signal) can be corrected to the first half-screen scene correction image that the user should see in 1.25 frames from the vertical synchronization signal. Assuming that pixel processing of the second half-screen is completed in the second half frame duration, the rendered second half-screen scene image (which is based on user posture data of about 1.5 frames from the vertical synchronization signal) can be corrected to the second half-screen scene correction image that the user should see 1.75 frames from the vertical synchronization signal. Therefore, the scene image output by the first half-screen and the scene image output by the second half-screen are closer to the picture expected by the user, and the tearing feeling while watching picture is reduced.

In step S960, the time-warped first half-screen scene data are transmitted to the second half-screen ATW thread by the first half-screen ATW thread.

Optionally, step S960 may transfer the corrected first half-screen scene data by calling a corresponding program, for example, a routine Eye Buffer in Android system for transferring rendered scene data through an EyeBuffer.

If the application has not ended, step S970 is executed. If the application ends, the thread is stopped.

In step S970, the next vertical synchronization signal is obtained.

Optionally, step S970 can be processed by calling a corresponding program, such as the routine GetVsync in Android system for acquiring vertical synchronization signals. The next vertical synchronization signal is, for example, the second vertical synchronization signal in FIG. 10, whereby subsequent cycles can be performed.

In addition, it should be pointed out that the first to fifth vertical synchronization signals and the like are shown in sequence in FIG. 10, but those skilled in the art should understand that the display operation is performed in each frame time of the display device, each frame picture for the first half-screen and the second half-screen of the display device is also processed according to the display scene processing method of FIG. 9 and FIG. 10, the rendering operation and the display (screen sweeping) operation of different frame pictures are performed in parallel in different components (e.g., CPU, GPU, T-con and the like), and time alignment and synchronization are performed through the vertical synchronization signals to ensure smooth display.

Figure 11:
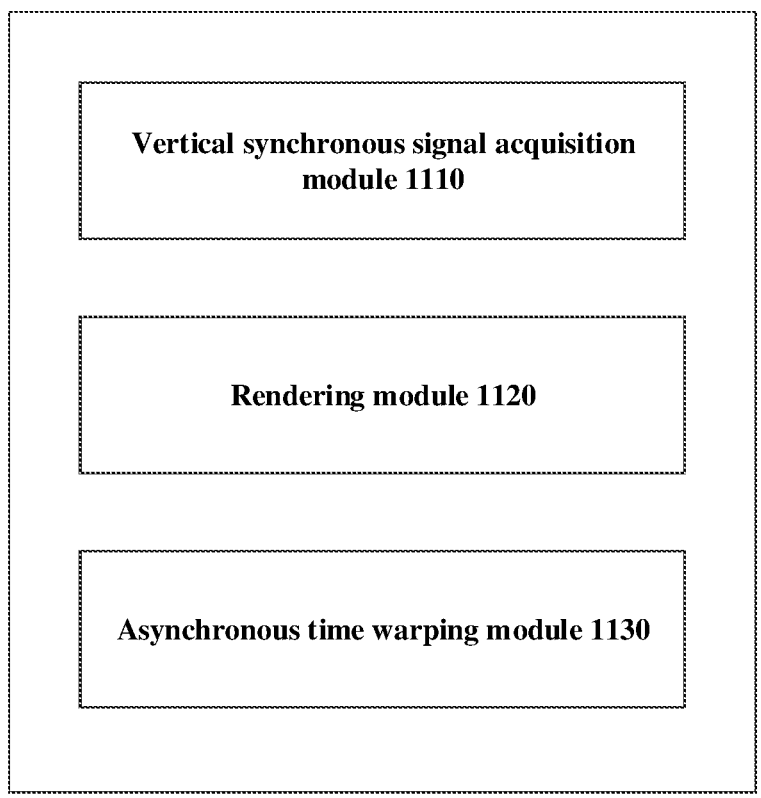
FIG. 11 is a block diagram illustrating a display scene processing device according to at least one embodiment of the present disclosure.

An apparatus applicable to virtual reality scene output according to an embodiment of the present disclosure will now be further described by FIG. 11.

FIG. 11 is a block diagram illustrating a display scene processing device according to at least one embodiment of the present disclosure.

Referring to FIG. 11, an apparatus for processing display scene according to at least one embodiment of the present disclosure includes a vertical synchronous signal acquisition module 1110, a rendering module 1120, and an asynchronous time warping module 1130.

The vertical synchronization signal acquisition module 1110 is configured to obtain a vertical synchronization signal; the rendering module 1120 is configured to execute the first half-screen rendering thread and the second half-screen rendering thread in parallel, based on the vertical synchronization signal, to render the first half-screen scene data and the second half-screen scene data respectively; the asynchronous time warping module 1130 is configured to perform an asynchronous time warping thread to correct the rendered first half-screen scene data and second half-screen scene data to obtain the first half-screen scene correction data and the second half-screen scene correction data.

The vertical synchronous signal acquisition module 1110, the rendering module 1120, and the asynchronous time warping module 1130 described above may be implemented by software, hardware, and firmware, or any combination thereof, and the method steps of other embodiments of the present disclosure may be similarly implemented by software, hardware, and firmware, or any combination thereof.

Devices provided by the present disclosure may include, but are not limited to, smart phones, tablets, media players, and the like. It should be noted that, for the sake of clarity, not all structures of the device are given. In order to realize the necessary functions of the device, those skilled in the art can set other structures not shown according to specific application scenarios, and the present invention is not limited to this.

In addition, according to at least one embodiment of the present disclosure, there is also provided an apparatus for processing display scenes including a processor and a memory on which computer program instructions are stored. The computer-executable instructions, when executed by the computer, can implement the display scene processing method according to the embodiment of the present disclosure.

According to at least one embodiment of the present disclosure, there is also provided a nonvolatile storage medium storing computer-executable instructions, wherein the computer-executable instructions, upon being executed by a processor, cause a computer to carry out the display scene processing method as described hereinabove.

The storage medium may be any combination of one or more computer-readable storage media, for example, a computer-readable storage medium contains computer-readable program code for randomly generating a sequence of action instructions, and another computer-readable storage medium contains computer-readable program code for performing display operations.

In general, various example embodiments of the present disclosure may be implemented in hardware or dedicated circuits, software, firmware, logic, or any combination thereof. Some aspects may be implemented in hardware, while other aspects may be implemented in firmware or software that may be executed by a controller, microprocessor, or other computing device. When aspects of embodiments of the present disclosure are illustrated or described as block diagrams, flow charts, or using some other graphical representation, it will be understood that the blocks, devices, systems, techniques, or methods described herein may be implemented as non-limiting examples in hardware, software, firmware, special purpose circuits or logic, general purpose hardware or controllers, or other computing devices, or some combination thereof.

The processor in the embodiment of the present disclosure may be an integrated circuit chip with signal processing capability. The above processors may be general purpose processors, digital signal processors (DSP), application specific integrated circuits (ASIC), off-the-shelf programmable gate arrays (FPGA) or other programmable logic devices, discrete gate or transistor logic devices, discrete hardware components. The disclosed methods, steps and logical block diagrams in the embodiments of the present application may be implemented or executed. The general-purpose processor may be a microprocessor or the processor may be any conventional processor or the like, and may be X86 architecture or ARM architecture.

The computer readable storage medium in embodiments of the present disclosure may be volatile memory or non-volatile memory, or may include both volatile and nonvolatile memory. The nonvolatile memory may be read only memory (ROM), programmable read only memory (PROM), erasable programmable read only memory (EPROM), electrically erasable programmable read only memory (EEPROM), or flash memory. The volatile memory may be random access memory (RAM), which serves as an external cache. By way of example and not limitation, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous connected dynamic random access memory (SLDRAM), and direct memory bus random access memory (DR RAM). It should be noted that the memories of the systems and methods described herein are intended to include, but are not limited to, these and any other suitable types of memories.

The display scene processing method and device thereof according to the embodiment of the disclosure can reduce the delay from rendering the scene to final output to the screen of the virtual reality application, so that the virtual reality application can maintain a higher frame rate to provide better rendering quality and further improve the user experience effect of the application.

The exemplary embodiments of the present disclosure described in detail above are merely illustrative and not restrictive. Those skilled in the art should understand that various modifications, combinations or sub-combinations can be made to these embodiments without departing from the principles and spirit of the present disclosure, and such modifications should fall within the scope of the present disclosure.

What is claimed is:

1. A display scene processing method, comprising:
   obtaining a vertical synchronization signal;
   executing a rendering thread to render a first half-screen scene data and a second half-screen scene data based on the vertical synchronization signal; and
   executing an asynchronous time warping thread to correct the rendered first half-screen scene data and the rendered second half-screen scene data, so as to obtain first half-screen scene correction data and second half-screen scene correction data, wherein the rendering of the first half-screen scene data and the second half-screen scene data is performed with a multiple render targets technique, and wherein executing a rendering thread for rendering a first half-screen scene data and a second half-screen scene data based on the vertical synchronization signal comprises:

predicting first user posture data after a first predetermined amount of display refresh frame from a current time point; and rendering the first half-screen scene data and the second half-screen scene data based on the first user posture data to obtain the rendered first half-screen scene data and the rendered second half-screen scene data.

2. The display scene processing method according to claim 1, wherein executing of the asynchronous time warping thread comprises:

after obtaining the rendered first half-screen scene data and the rendered second half-screen scene data, predicting second user posture data at a start time point of a display frame and a third user posture data at an end time point of the display frame, wherein the display frame is a frame during which the first half-screen scene data and the second half-screen scene data are displayed; and correcting the rendered first half-screen scene data and the rendered second half-screen scene data based on the second user posture data and the third user posture data, to obtain the first half-screen scene correction data and the second half-screen scene correction data.

3. The display scene processing method according to claim 2, wherein correcting the rendered first half-screen scene data and the rendered second half-screen scene data based on the second user posture data and the third user posture data comprises:

performing an interpolation calculation based on the second user posture data and the third user posture data to obtain a first asynchronous time warping correction reference data; and correcting the rendered first half-screen scene data and the rendered second half-screen scene data based on the first asynchronous time warping correction reference data.

4. The display scene processing method according to claim 1, wherein executing of the asynchronous time warping thread comprises:

predicting data of a user posture at a quarter of a display frame after a start time point of the display frame, so as to obtain a second asynchronous time warping correction reference data for the first half-screen scene, wherein the display frame is a frame during which the first half-screen scene data and the second half-screen scene data are displayed;

correcting the rendered first half-screen scene data based on the second asynchronous time warp correction reference data to obtain the first half-screen scene correction data;

predicting data of a user posture at three-quarters of the display frame after the start time point of the display frame, so as to obtain a third asynchronous time warp correction reference data for the second half-screen scene; and correcting the rendered second half-screen scene data based on the third asynchronous time warp correction reference data to obtain the second half-screen scene correction data.

5. The display scene processing method according to claim 1, further comprising: performing an anti-distortion processing on the first half-screen scene correction data and the second half-screen scene correction data to obtain a first half-screen scene output data and a second half-screen scene output data.

6. The display scene processing method according to claim 5, wherein the anti-distortion processing is at least one of vertex displacement-based anti-distortion processing, mesh-based anti-distortion processing, or pad-based anti-distortion processing.

7. The display scene processing method according to claim 5, further comprising:

outputting the first half-screen scene output data and the second half-screen scene output data to a first half-screen display screen and a second half-screen display screen respectively, so as to display the first half-screen scene output data and the second half-screen scene output data in a display frame, wherein the display frame is a frame during which the first half-screen scene data and the second half-screen scene data are displayed.

8. The display scene processing method according to claim 1, wherein executing of the rendering thread comprises:

executing a first half-screen rendering thread and a second half-screen rendering thread in parallel to render the first half-screen scene data and the second half-screen scene data respectively, wherein the first half-screen rendering thread is executed on the first half-screen scene data and the second half-screen rendering thread is executed on the second half-screen scene data.

9. The display scene processing method according to claim 8, wherein executing of the asynchronous time warping thread comprises:

executing in parallel a first asynchronous time warping thread and a second asynchronous time warping thread, so as to obtain the first half-screen scene correction data and the second half-screen scene correction data, wherein the first asynchronous time warping thread is executed on the rendered first half-screen scene data and the second asynchronous time warping thread is executed on the second rendered half-screen scene data.

10. The display scene processing method according to claim 9, wherein executing of the rendering thread for the first screen half comprises:

predicting fourth user posture data after time of (M+0.5) display refresh frames from the vertical synchronization signal, wherein M is greater than or equal to 1; and rendering the first half-screen scene data based on the fourth user posture data to obtain the rendered first half-screen scene data.

11. The display scene processing method according to claim 10, wherein executing the second screen half rendering thread further comprises:

predicting seventh user posture data after time of (K+0.5) display refresh frames from the vertical synchronization signal, wherein K is greater than or equal to 1; and rendering the second half-screen scene data based on the seventh user posture data to obtain the rendered second half-screen scene data.

12. The display scene processing method according to claim 11, wherein executing of the second asynchronous time warping thread comprises:
  after obtaining the rendered second half-screen scene data, predicting eighth user posture data at a half of frame after a start time point of the display frame and ninth user posture data at an end time point of the display frame, wherein the display frame is a frame during which the first half-screen scene data and the second half-screen scene data are displayed; and
  correcting the rendered second half-screen scene data based on the eighth user posture data and the ninth user posture data to obtain the second half-screen scene correction data.

13. The display scene processing method according to claim 11, wherein executing of the second asynchronous time warping thread comprises:
  predicting data of a user posture at three quarters of frame after a start time point of the display frame to obtain a seventh asynchronous time warping correction reference data for the second half-screen scene, wherein the display frame is a frame during which the first half-screen scene data and the second half-screen scene data are displayed; and
  correcting the rendered second half-screen scene data based on the seventh asynchronous time warp correction reference data to obtain the second half-screen scene correction data.

14. The display scene processing method according to claim 9, wherein executing of the first asynchronous time warping thread comprises:
  after obtaining the rendered first half-screen scene data, predicting fifth user posture data at a start time point of a display frame and sixth user posture data at an end time point of the display frame, wherein the display frame is a frame during which the first half-screen scene data and the second half-screen scene data are displayed; and
  correcting the rendered first half-screen scene data based on the fifth user posture data and the sixth user posture data to obtain the first half-screen scene correction data.

15. The display scene processing method according to claim 14, wherein correcting the rendered first half-screen scene data based on the fifth user posture data and the sixth user posture data comprises:
  performing an interpolation calculation based on the fifth user posture data and the sixth user posture data to obtain a fourth asynchronous time warping correction reference data for the first half screen scene, and then correcting the rendered first half-screen scene data based on the fourth asynchronous time warping correction reference data.

16. The display scene processing method according to claim 9, further comprising:
  transferring, by the first asynchronous time warping thread, the first half-screen scene correction data to the second asynchronous time warping thread.

17. An apparatus for processing display scenes, comprising: a processor and a memory,
  wherein computer-executable instructions that are suitable to be executed by the processor are stored in the memory,
  upon being executed by the processor, the computer-executable instructions cause the processor to carry out the display scene processing method according to claim 1.

18. A non-transitory computer readable storage medium storing computer-executable instructions, wherein the computer-executable instructions, upon being executed by a processor, cause a computer to carry out the display scene processing method according to claim 1.

* * * * *